United States Patent [19]
Kuse et al.

[11] Patent Number: 6,105,239
[45] Date of Patent: *Aug. 22, 2000

[54] AUTOMATIC ASSEMBLING SYSTEM

[75] Inventors: Tsutomu Kuse; Shizuo Yamazaki, both of Odawara; Hiroshi Kato, Hadano; Mikio Rachi; Keisuke Yamaoka, both of Odawara; Tomoaki Sakata, Hiratsuka, all of Japan

[73] Assignee: Hitachi, Ltd., Tokyo, Japan

[ * ] Notice: This patent is subject to a terminal disclaimer.

[21] Appl. No.: 08/979,323

[22] Filed: Nov. 26, 1997

Related U.S. Application Data

[62] Division of application No. 08/524,254, Sep. 6, 1995, Pat. No. 5,737,827.

[30] Foreign Application Priority Data

Sep. 12, 1994 [JP] Japan ................................ 6-217536

[51] Int. Cl.[7] .......................... B23Q 15/00; B23P 19/00; B23P 21/00
[52] U.S. Cl. ................... 29/705; 29/710; 29/783; 29/784; 29/791; 29/799; 29/824
[58] Field of Search .................. 29/705, 110, 722, 29/783, 784, 799, 430, 701, 711, 822, 823, 824, 791; 198/347.1; 414/222.07, 222.08, 225.01

[56] References Cited

U.S. PATENT DOCUMENTS

| | | |
|---|---|---|
| 4,237,598 | 12/1980 | Williamson . |
| 4,678,390 | 7/1987 | Bonneton et al. . |
| 4,737,095 | 4/1988 | Hehl . |
| 4,894,908 | 1/1990 | Haba, Jr. et al. . |
| 5,125,149 | 6/1992 | Inaba et al. . |
| 5,182,843 | 2/1993 | Umetsu et al. . |
| 5,310,396 | 5/1994 | Momoi et al. . |
| 5,355,579 | 10/1994 | Miyasaka et al. . |
| 5,380,138 | 1/1995 | Kasai et al. . |
| 5,394,606 | 3/1995 | Kinoshita et al. . |
| 5,401,229 | 3/1995 | Otsuka et al. . |
| 5,507,085 | 4/1996 | Easton et al. . |
| 5,737,827 | 4/1998 | Kuse et al. . |

FOREIGN PATENT DOCUMENTS

| | | |
|---|---|---|
| 59-115130 | 7/1984 | Japan . |
| 61-65759 | 4/1986 | Japan . |
| 63-295128 | 12/1988 | Japan . |
| 63-295135 | 12/1988 | Japan . |
| 64-40231 | 2/1989 | Japan . |
| 1-188240 | 7/1989 | Japan . |
| 3-35964 | 2/1991 | Japan . |
| 1419663 | 7/1989 | U.S.S.R. . |
| 1812063 | 4/1993 | U.S.S.R. . |

*Primary Examiner*—David P. Bryant
*Attorney, Agent, or Firm*—Mattingly, Stanger & Malur, P.C.

[57] ABSTRACT

An automatic assembling system for assembling a product constituted by a plurality of parts, includes a group cell having a plurality of assembling cells and inspecting cells, pallets loaded with the same type of parts or products, at least one buffer for holding a plurality of pallets, and at least one pallet hand-over mechanism for transferring pallets between the buffer and each cell. At least one of the buffers is provided in common for a plurality of cells, and at least one of the pallet hand-over mechanisms is provided to the common buffer.

27 Claims, 16 Drawing Sheets

FIG. 17a
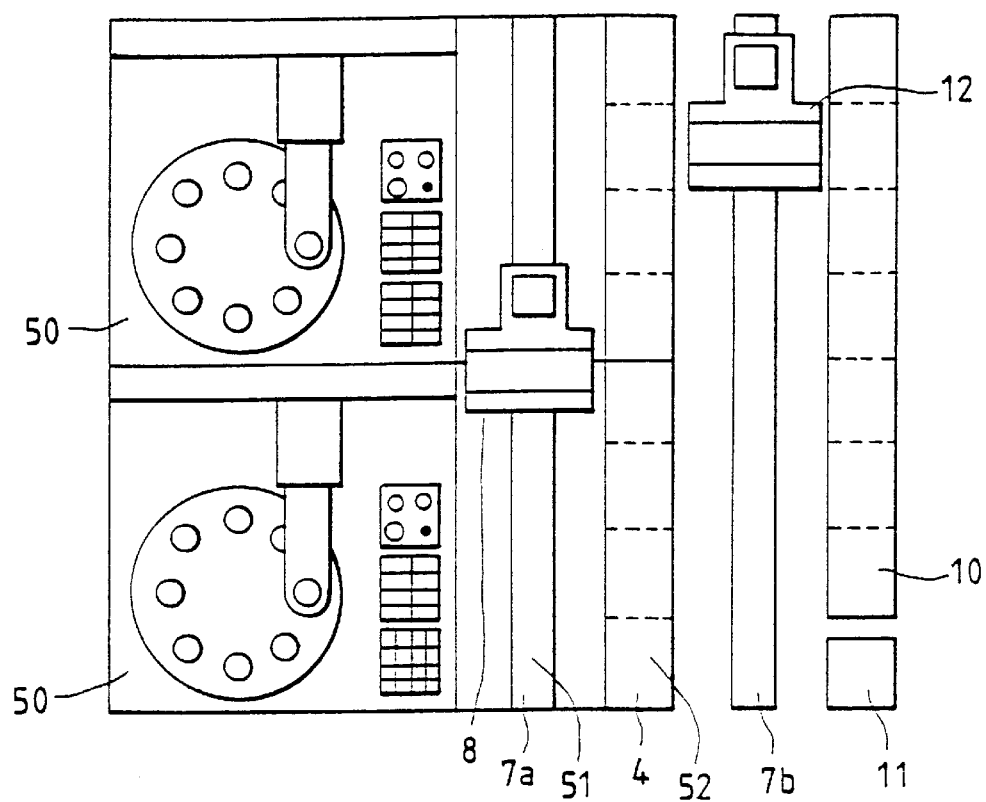
FIG. 18
FIG. 19
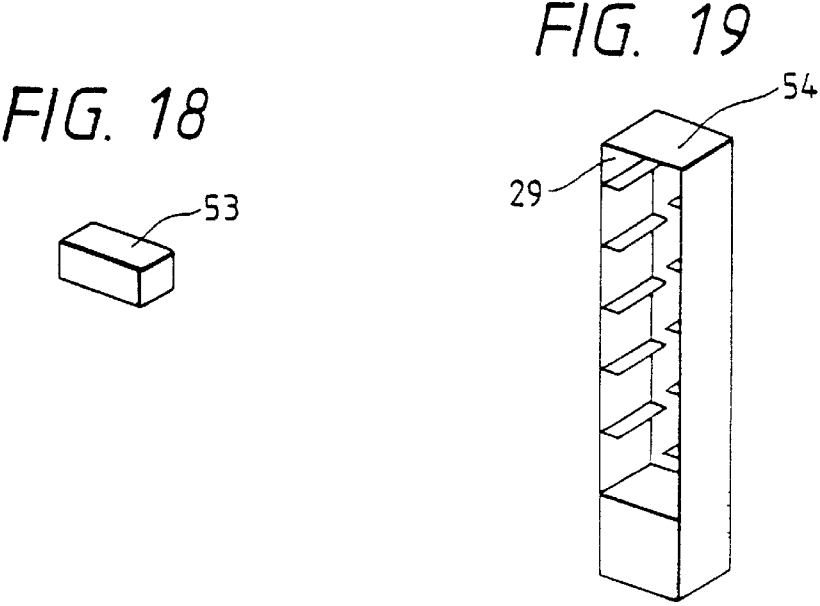

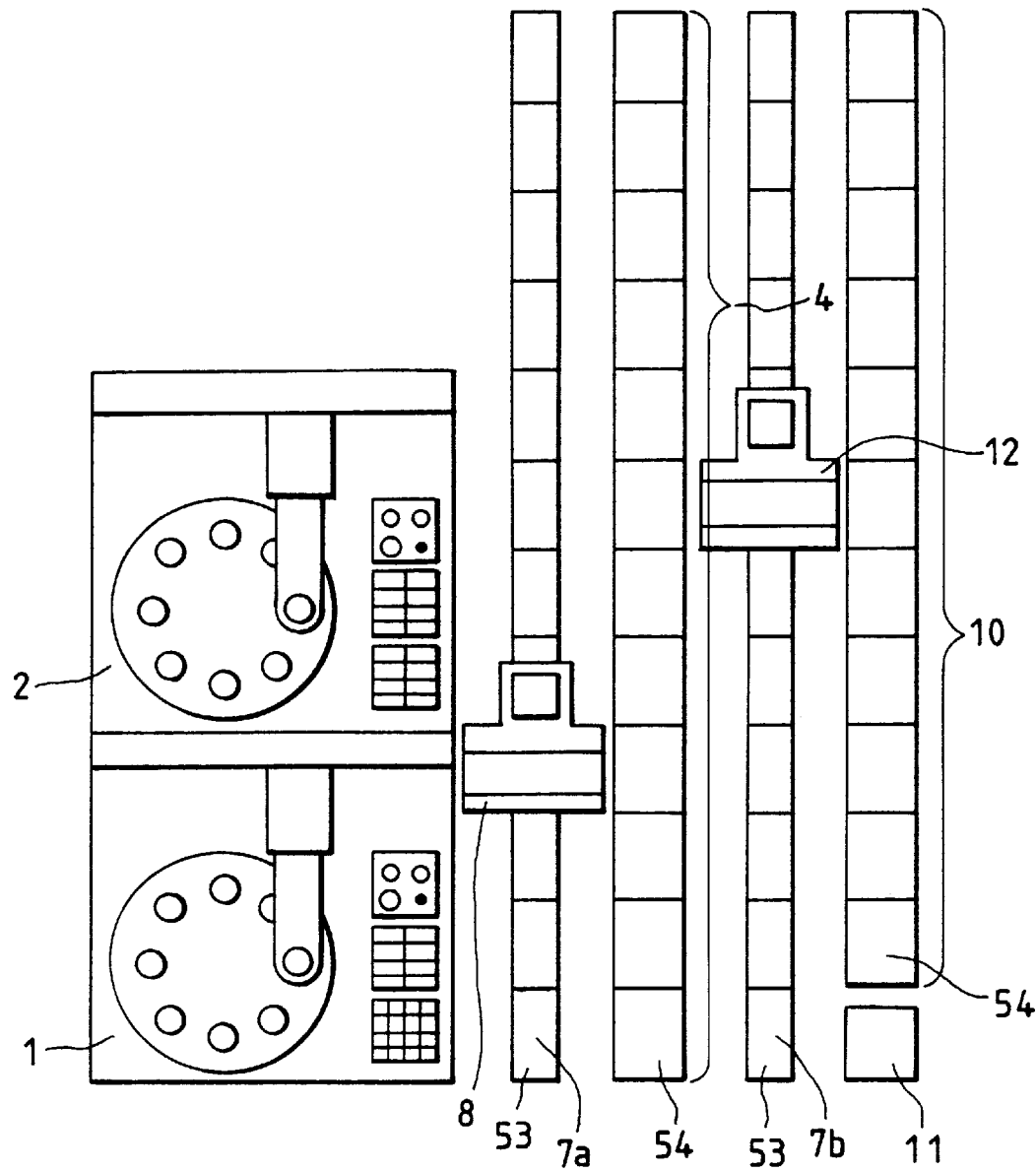

AUTOMATIC ASSEMBLING SYSTEM

This is a divisional application of U.S. Ser. No. 08/524,254, filed Sep. 6, 1995, now U.S. Pat. No. 5,737,827.

BACKGROUND OF THE INVENTION

1. Field of the Invention

The present invention relates to an automatic assembling system for automatically assembling products comprising a plurality of parts, and more particularly relates to an automatic assembling system which is advantageous in that a pallet transfer frequency is reduced for transferring a pallet between assembling steps, space efficiency is excellent, control of the number of parts in a pallet is needless, the cycle time for pallet supply is reduced, and mixed production (production of different types of products in a flow production) and fluctuation of the production are accommodated flexibly.

2. Description of the Related Art

Japanese Patent Laid-Open No. Sho 64-40231 (1989) has proposed a system provided with one assembling robot and a plurality of hands and tools in which the robot exchanges hands and tools, and feeds parts to an assembling cell for assembling a plurality of types of parts. The structure of this equipment is described below.

In this system, a plurality of pallets which carry a plurality of parts individually for types of parts are contained in a stockpiler, and pallets are transferred one by one according to a place where a robot can pick up a part from the pallet. The assembling robot is provided with adaptable hands and tools, picks up a required number of parts from the pallet, and assembles them. After assembling, the pallet is returned to the stockpiler, and waits for the next request in the assembling cycle.

This operation is repeated for required types of parts, and a series of assembling cycles is thus completed.

When the number of parts on a pallet decreases after repeated assembling cycles, desired parts on a plurality of pallets temporarily stored in a buffer are fed to the stockpiler. An empty pallet is removed from the production system, which comprises equipment, from the stockpiler by an expulsion mechanism. A carrier, which is provided to move between a warehouse unit and the production system, feeds new pallets to the buffer and recovers empty pallets.

This system is superior to the method disclosed in Japanese Patent Laid-Open No. Sho 63-295128 (1988), which uses a kit pallet carrying a plurality of different types of parts thereon, in that a pallet is used as it was stocked in a warehouse unit. Generally, parts carried on pallets containing a plurality of one type of part are fed to the warehouse unit for an assembling system. In the kit pallet system, parts of a plurality of types must be transferred from individual pallets which are fed to the warehouse unit to kit pallets. This transfer requires considerable work as heavy as the assembling work, and requires considerable man-hours.

However, the above-mentioned Japanese Patent Laid-Open No. 64-40231 (1989) involves some problems as described below.

SUMMARY OF THE INVENTION

First, generally a production process is not completed with one assembling cell. It requires a transfer to the next step, that is, semi-manufactured products are transferred to the next assembling cell or completed products are transferred to a functional inspection step. A pallet which contains semi-manufactured products or completed products is taken out from an assembling cell and put into a stockpiler, subsequently removed and transferred to and stored in a buffer for the next step, transferred to a stockpiler for the next step, and then fed to the cell of the next step. Thus, because a pallet is transferred very often, the shock of transfer damages the products and reduces the reliability of an automatic system.

Second, carriers are used when a parts pallet is transferred from a warehouse unit to a buffer, and an empty pallet and a completed product pallet are transferred from an expulsion mechanism to the warehouse unit. A carrier moves horizontally in the factory, but the horizontal movement makes the space efficiency poor. Especially, in the case that the environment or atmosphere is required to be kept clean, a wide clean room is required, including the warehouse unit and the moving space of the carriers. The wide clean room causes a problem of expensive building construction costs and maintenance costs.

Third, because parts are individually taken from a pallet, control of the residual number of parts is required to detect when the pallet becomes empty. The control requires a complex and expensive control system.

Fourth, pallets are fed to an assembling robot one by one. Every time a type of part is incorporated, movement of the pallet is required, which results in a long assembling cycle.

Fifth, there is no means for exchanging hand and tool to be adapted to another type of product. Thus, mixed production of different types of products cannot be accommodated, which results in poor flexibility of the system.

It is an object of the present invention to provide an automatic assembling system in which pallet transfer is reduced for transferring a pallet between steps, space efficiency is excellent, control of the number of parts in a pallet supply is needless, the time increment in the cycle time for pallet supply is reduced, and mixed production and fluctuating production is accommodated flexibly.

To accomplish the above mentioned object of the present invention, the following technical means are applied.

(1) In an automatic assembling system comprising a plurality of assembling cells and inspection cells, one or a plurality of pallet containers (referred to as common buffers hereinafter) which are common for some of these cells are provided. At least one pallet receiving mechanism is provided to one common buffer, and the common pallet receiving mechanism is served to hand-over pallets between the common buffer and each cell which uses the common buffer.

(2) The above mentioned common buffer is virtually a shelf provided with many partitions at least in the vertical direction. The above mentioned pallet receiving mechanism is movable in a vertical plane in front of the shelf. The partitions of the common buffer shelf are structured so as to contain pallets and to pass a pallet from the front to the rear or from the rear to the front. A plurality of common buffers are provided in a line side by side to constitute a big shelf as a group common buffer. The warehouse unit is a warehouse shelf which is provided with many partitions in the vertical and horizontal directions for containing pallets. The warehouse shelf is installed in parallel to the group common buffer shelf and opposite from the assembling cells and inspection cells. Between the warehouse shelf and the group common buffer shelf, one or a plurality of pallet receiving mechanisms which are movable in a vertical plane are provided.

(3) On a parts pallet, a plurality of parts of the same typed are placed. The number of parts is the number required to make N units of product or the number (an integer) equivalent to (the number of parts required to make N units of product)×(1/M), wherein M is an integer. For an assembling cell, integral multiples of N assembling heads are provided. All parts which are fed from a parts pallet to an assembling cell are used entirely for assembling, and the parts pallet is returned empty.

(4) A plurality of pallet stands for receiving pallets are provided on an area in at least an assembling cell and a movable area of a pallet receiving mechanism. A plurality of pallet stands for receiving pallets are provided on an area in an assembling cell, a movable area of a pallet receiving mechanism, and a movable area of an assembling robot.

(5) A plurality of hands and tools corresponding to one type of product are placed on one or a plurality of hand pallets, the hand pallet is contained in the same common buffer as that used for the corresponding parts pallets, and the same pallet receiving mechanism as used to hand-over parts pallets is used to transfer hand pallets between common buffers and assembling cells.

The technical means described above exhibits the following operations.

(1) Pallets are transferred directly between common buffers and cells which are supplied commonly from the buffers. A pallet which contains semi-manufactured products assembled in a cell or completed products inspected in an inspection cell is taken out from the cell and transferred to a common buffer to be contained, and when receiving a request from the cell of the next step, the pallet is taken out from the common buffer and transferred to the cell. This operation results in a reduced frequency of pallet transfer when proceeding to the next step.

In the case that the working cycle of cells happens to be synchronized, a pallet taken out from a cell is transferred directly to another cell without staying in a common buffer. In this case, the frequency of pallet transferring is minimized. Therefore, pallet transfer with high operational reliability and reduced product damage is realized.

(2) The common buffer and warehouse unit are structured so as to have shelves extending in the vertical plane, and the pallet transfer mechanism is operable in the vertical plane. Thereby, an automatic assembling system with a reduced occupied floor area is realized. A common buffer is structured so as to have a passage for a pallet from the front to the back and from the back to the front. Group assembling and inspection cells, group common buffers, and a warehouse unit are provided in parallel. This arrangement realizes an automatic assembling system with high space efficiency.

(3) All parts on a parts pallet fed to an assembling cell are consumed entirely in the assembling cell, and the parts pallet is returned empty. Thereby, control of the number of residual parts on a pallet is needless, and the control system is simplified.

(4) A plurality of pallets on which different types of parts are placed are fed to an assembling cell, and no exchanging of pallets is required every time a type of part is to be incorporated. The recovery of an empty pallet after assembling of some parts from a cell to a buffer and the feeding of a parts pallet of the next type of parts from a buffer to a cell are conducted during assembling of another type of parts. Thereby, the time increment due to pallet exchanging is eliminated.

(5) Hands and tools corresponding to different types of products are fed from a buffer to a cell and from a cell to a buffer as in the same manner as is used for parts, semi-manufactured products and completed products. Thereby, a highly flexible automatic assembling system which accommodates mixed production is realized without an added special mechanism.

BRIEF DESCRIPTION OF THE DRAWINGS

FIG. 17a is a plan view of an automatic assembling system constituted with a combination of standard assembling cells shown in FIG. 16a of the fourth embodiment in accordance with the present invention;

FIG. 18 is a perspective view of a rail module of the fifth embodiment in accordance with the present invention;

FIG. 19 is a perspective view of a shelf module of the fifth embodiment in accordance with the present invention; and FIG. 20 is a plan view of the automatic assembling system using the rail module shown in FIG. 18 and the shelf module shown in FIG. 19 for illustrating the fifth embodiment in accordance with the present invention.

DESCRIPTION OF THE PREFERRED EMBODIMENTS

The first embodiment of the present invention is described below referring to FIG. 1a to FIG. 11. Arrows X, Y, and Z attached to these figures mean three-dimensional XYZ spaces.

Figure 1A:
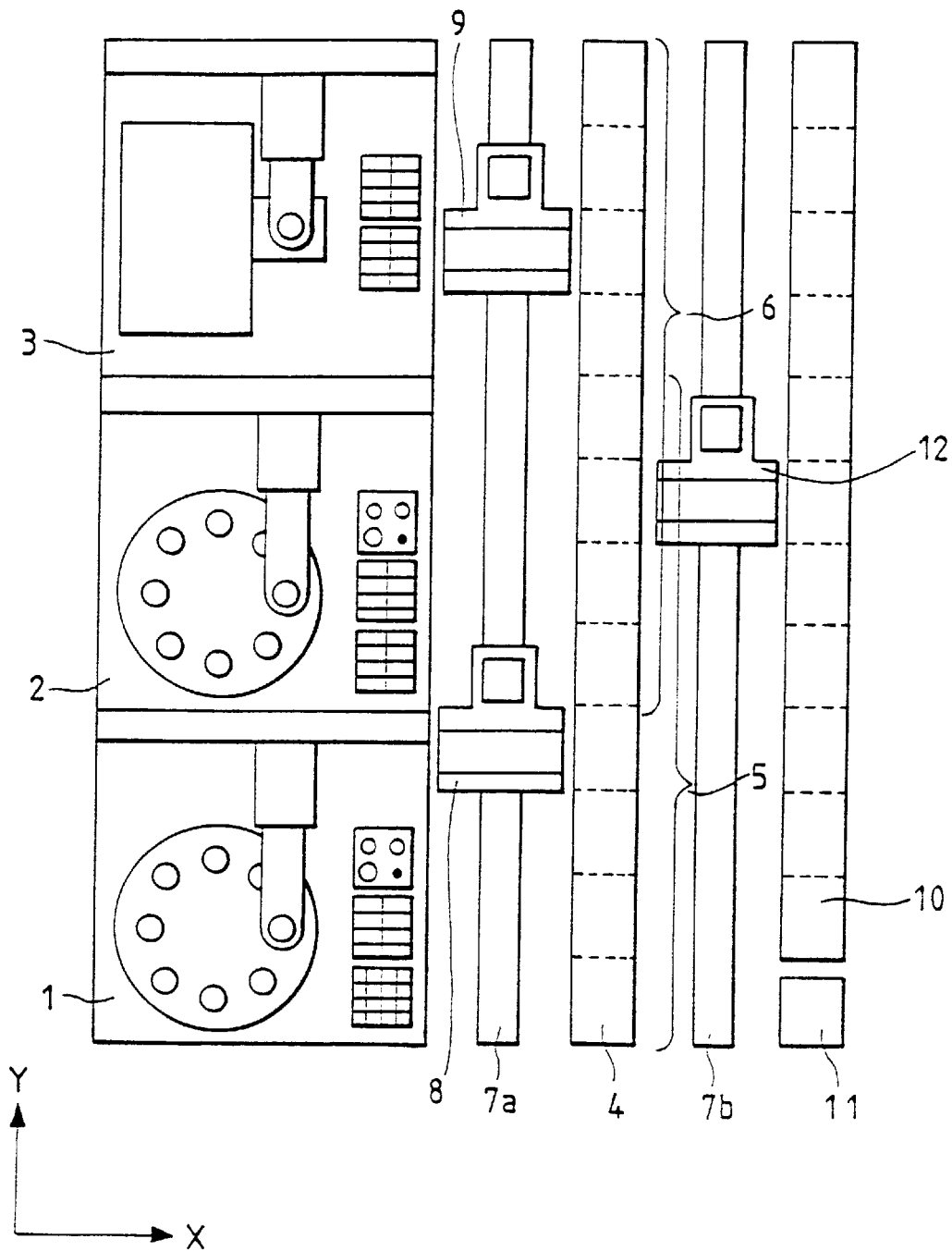
FIG. 1a is a plan view of an automatic assembling system of the first embodiment in accordance with the present invention.
Figure 1B:
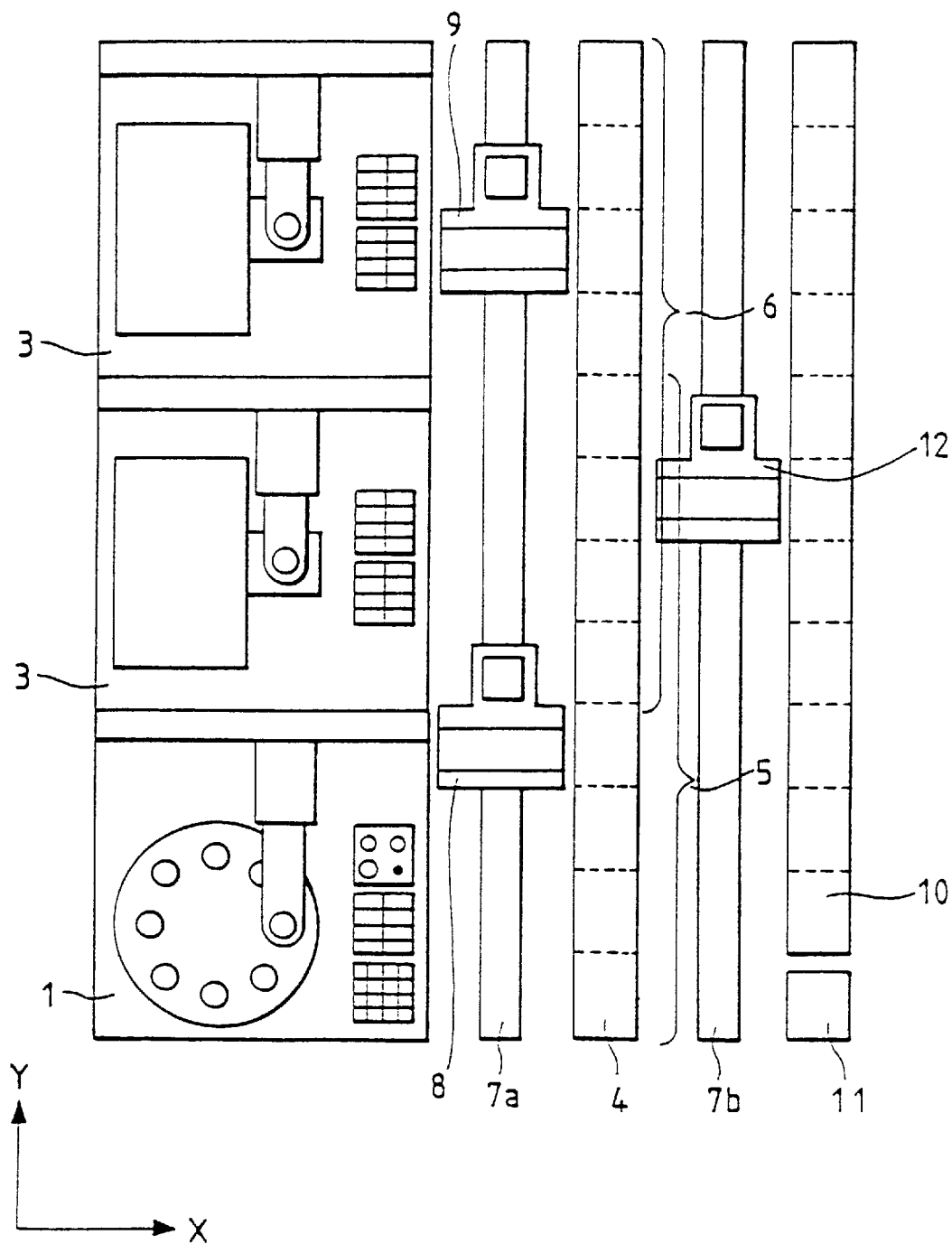
FIG. 1b is another plan view of the automatic assembling system of FIG. 1a which shows a plurality of inspection cells 3.
Figure 2:
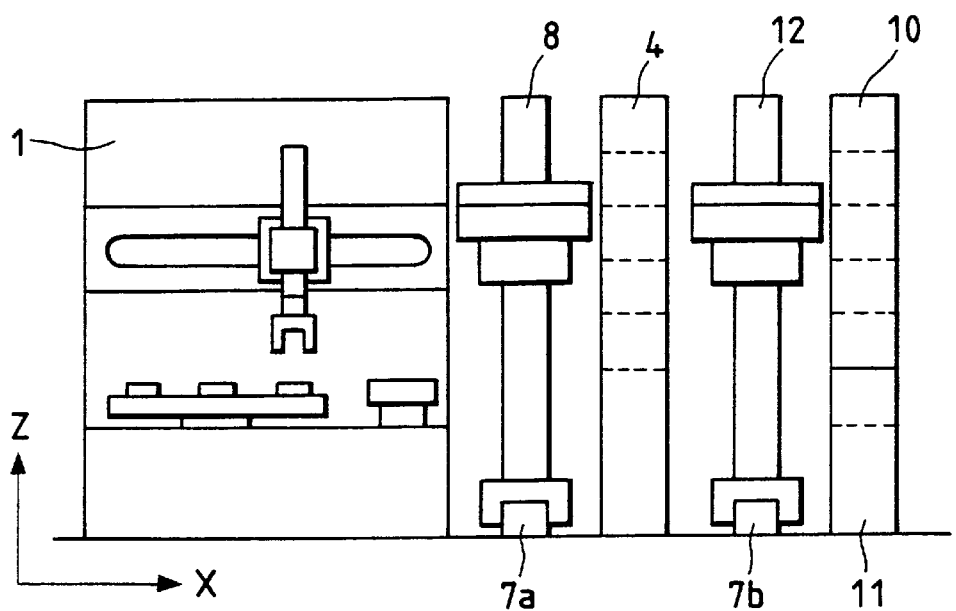
FIG. 2 is a side view of the automatic assembling system of the first embodiment in accordance with the present invention.

In FIG. 1a and FIG. 2, assembling cells 1 and 2 and an inspection cell 3 are provided in a line in the Y-direction to form a group. FIG. 1b shows one assembling cell 1 and two inspection cells 3, for comparison, and by way of example only. A buffer shelf 4 is a large shelf provided parallel to the group of cells (Y-direction). Among the buffer shelf 4, a section of a common buffer 5 is common to the assembling cells 1 and 2, and a section of a common buffer 6 is common for the assembling cell 2 and the inspection cell 3.

Between the group cells and the buffer shelf 4, a running rail 7a is provided in parallel to these cells (Y-direction). On the running rail 7a, stocker cranes 8 and 9 are engaged with the running rail 7a movably in the Y-direction in the figure. The stocker crane 8 moves in the range of common buffer 5 and the stocker crane 9 moves in the range of the common buffer 6. A warehouse shelf 10 and a delivering-receiving station 11 are provided on the opposite side from the group cells in parallel to the buffer shelf 4. Between the buffer shelf 4 and the warehouse shelf 10, a running rail 7b is provided in parallel to the buffer shelf 4 and warehouse shelf 10 (Y-direction). On the running rail 7b, a stocker crane 12 is engaged movably in the Y-direction in the figure. The stocker crane 12 moves in the range of the warehouse shelf 10 and the delivering-receiving station 11.

Figure 3:
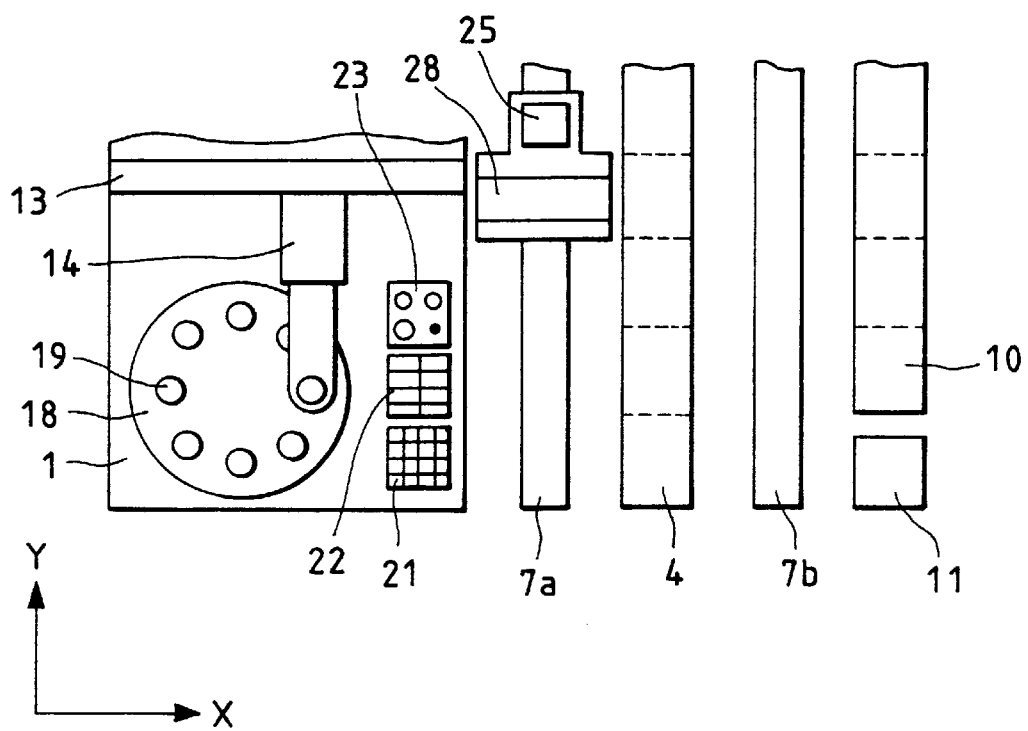
FIG. 3 is a partially enlarged plan view of the automatic assembling system shown in FIGS. 1a, 1b.
Figure 4:
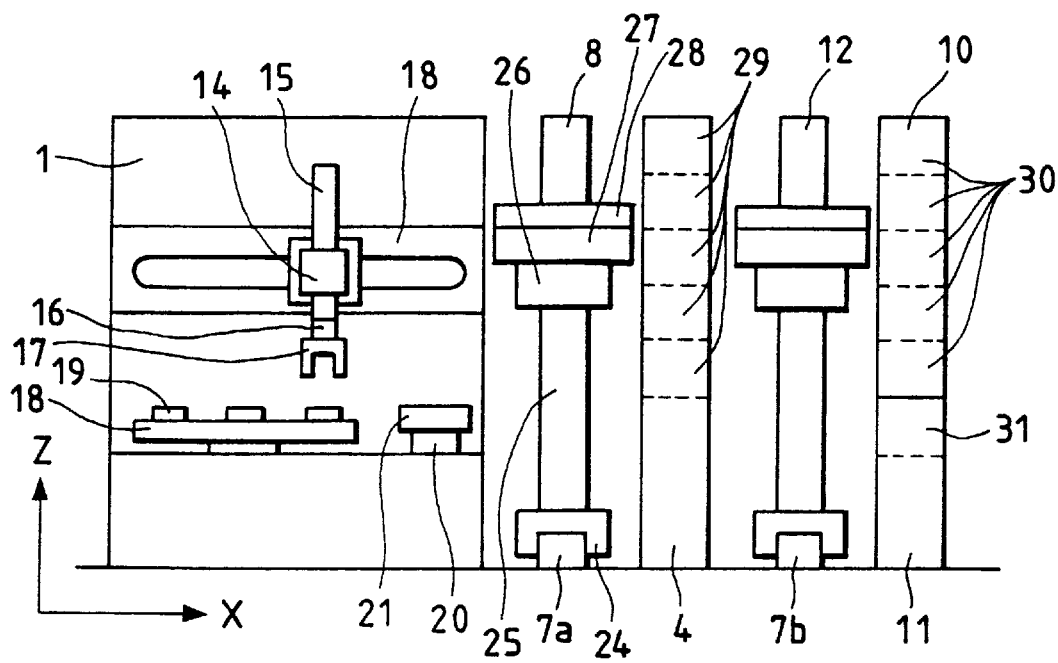
FIG. 4 is a partially enlarged side view of the automatic assembling system shown in FIG. 2.

Next, the detailed structure of the embodiment is described referring to FIG. 3 and FIG. 4. In the first place, the structure of the assembling cell 1 is described. A hand 17 (FIG. 4) of the assembling cell 1 is attached detachably to a hand holder 16, and the hand holder 16 is fixed to a Z-shaft unit 15. The Z-shaft unit 15 is for moving the hand holder 16 in the Z-direction in the figure. The Z-shaft unit 15 is fixed to a Y-shaft unit 14. The Y-shaft unit 14 is for moving the Z-shaft unit 15 in the Y-direction (FIGS. 1a, 1b). The Y-shaft unit 14 is fixed to an X-shaft unit 13 (FIG. 3). The X-shaft unit 13 is for moving Y-shaft unit 14 in the X-direction, and the X-shaft unit 13, Y-shaft unit 14, and Z-shaft unit 15 constitute an orthogonal three-dimensional robot.

On an index table 18 of the assembling cell 1, eight assembling heads 19 are fixed. The index table 18 is rotated to position assembling heads 19. On the assembling cell 1, three pallet stands 20 are provided (only one pallet stand is shown in FIG. 4 due to the restriction on the drawing). On the three pallet stands 20, two parts pallets 21 and 22 and a hand pallet 23 are placed, respectively (FIG. 3).

Next, the structure of the stocker crane 8 (FIG. 4) is described. On the rail 7a, a running unit 24 of the stocker crane 8 is engaged. The running unit 24 is for moving the whole stocker crane 8 in the Y-direction. On the running unit 24, an elevating rail 25 is fixed, and on the elevating rail 25, an elevating unit 26 is engaged. A horizontally moving unit 27 is fixed to the elevating unit 26, and on the horizontally moving unit 27, a fork 28 is fixed. The fork 28 moves in the X-direction by the horizontally moving unit 27. The horizontally moving unit 27 and elevating unit 26 are moved in the Z-direction along the elevating rail 25 by the elevating unit 26.

The stocker cranes 9 and 12 (FIGS. 1a, 1b) have the same structure as the stocker crane 8.

Next, the structure of the buffer shelf 4 is described. The buffer shelf 4 is divided into a plurality of partitions as shown with dotted lines in the Y-direction (refer to FIG. 3). One partition divided as shown in FIG. 4 is divided into a plurality of partitions 29 in the Z-direction. The partitions 29 can accept parts pallets 21 and 22 and a hand pallet 23 thereon, and can also accept the access of the stocker crane 8 or 9 and the stocker crane 12 in both directions, to allow a pallet to be taken out from the partition. The structure of partitions 29 will be described hereinafter referring to FIG. 7 to FIG. 11.

The warehouse shelf 10 is divided into a plurality of partitions (refer to FIG. 3) as shown in dotted lines in the Y-direction in the same manner as described for the buffer shelf 4. Each partition divided as mentioned above is further divided into a plurality of partitions 30 in the Z-direction as shown in FIG. 4 with dotted lines. In this embodiment, the structure of the partitions 30 is the same as the partitions 29.

The delivering-receiving station 11 is not divided in the Y-direction (refer to FIG. 3) in this embodiment, but in the Z-direction only one partition 31 is provided. The partition 31 has the same structure as the partitions 29.

Figure 5:
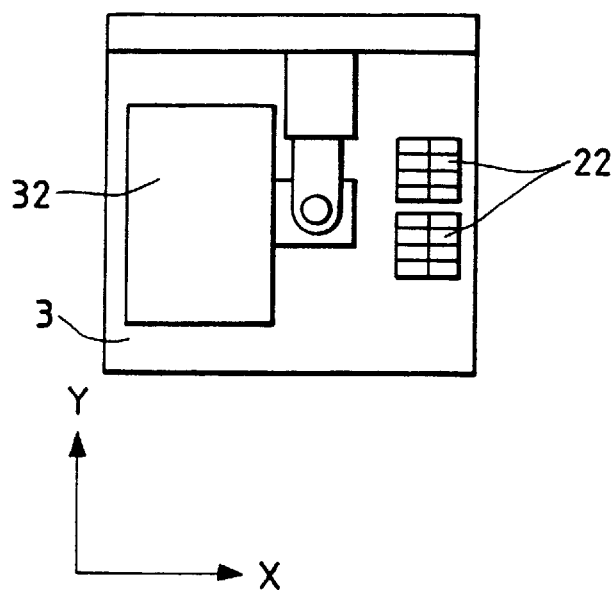
FIG. 5 is a partially enlarged plan view of an inspection cell shown in FIGS. 1a, 1b.
Figure 6:
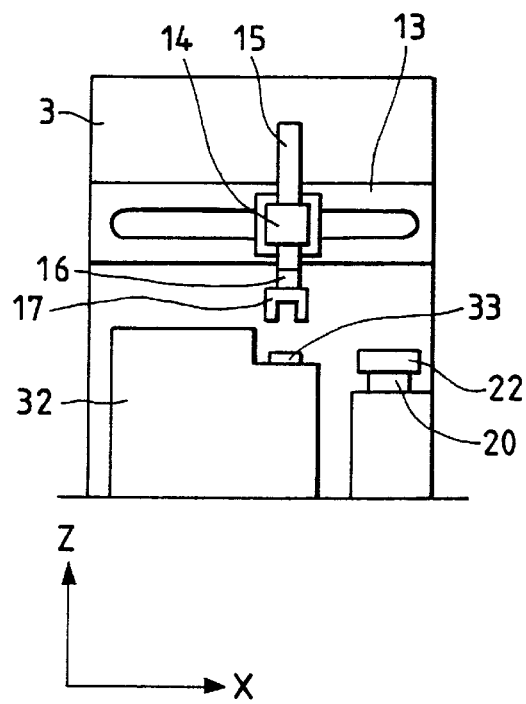
FIG. 6 is a partially enlarged side view of the inspection cell shown in FIG. 2.

Next, the structure of the inspection cell 3 is described referring to FIG. 5 and FIG. 6. FIG. 5 is a partially enlarged plan view of the inspection cell 3 shown in FIGS. 1a and 1b, and FIG. 6 is a partially enlarged side view of the inspection cell 3 shown in FIG. 2.

A holder 33 (FIG. 6) is provided to an inspector 32 in the inspection cell 3. On the holder 33, a completed product or semi-manufactured product is individually mounted. Two pallet stands 20 are provided, and the parts pallet 22 (or the parts pallet 21) is placed thereon. The other structure is the same as that described for the assembling cell 1.

Next, the operation of the embodiment having the structure described above will be described.

First, the operation of the assembling cell is described referring to FIG. 3 and FIG. 4. The assembling cell 1 assembles completed products or semi-manufactured products set-wise, in sets of eight units. On the parts pallets 21 and 22 fed to the assembling cell, parts for assembling are placed in integral multiples of eight or in a number of (integral multiple of eight)×(1/M), wherein M and the number are integers. In this embodiment, eight parts are placed on the parts pallet 22, wherein one part is used for one product. Sixteen parts are placed on the parts pallet 21, wherein two parts are used for one product. Generally, the number of parts placed on a pallet is the number required for production of N units of the product or the number equivalent to (the number of parts required for production of N units of the product)×(1/M), wherein M is an integer. Thereby, all parts placed on a pallet are consumed entirely for assembling, and the empty pallet is returned to the buffer shelf 4.

The hand 17 holds one part on the parts pallet 22, transfers to an assembling head out of eight assembling heads 19 at a certain place in the moving range of the orthogonal robot comprising the X-shaft unit 13, the Y-shaft unit 14, and the Z-shaft unit 15. Then, the index table 18 is driven for dividing, another assembling head 19 is positioned to a certain position, subsequently another part is transferred and placed on the assembling head 19. This operation is repeated eight times totally to finish the assembling of the parts on the pallet 22 until the pallet 22 becomes empty.

Next, parts on the parts pallet 21 are incorporated. If the hand 17 does not adapt to the parts, the hand 17 is removed from the hand holder 16 and returned to a certain place on the hand pallet 23, and another adaptable hand (not shown in the figure) is attached to the hand holder 16. Two parts on the parts pallet 21 are transferred and placed on one assembling head 19 individually. The operation of sixteen times transferring and placing and eight times indexing is enough for the completion of the incorporation. If other types of parts are required to be incorporated, during the incorporation of parts on the parts pallet 21, the empty parts pallet 22 is placed by the stocker crane 8 into the buffer shelf 4, and the parts pallet for the next type of parts is fed onto the pallet stand 20 by the stocker crane 8 to wait for the next request. By supplying parts pallet 21 or 22 alternately on the two pallet stands 20 as described above, using the stocker crane 8, parts which are adaptable to a plurality of hands (not shown in the figure) on the hand pallet 23 are incorporated in the assembling cell 1.

The assembling cell 2 is the same as the assembling cell 1 or different from the assembling cell 1 in the type of hand on the hand 17 and the hand pallet 23. Generally, to double the production capacity, the same structure is utilized, and to divide the process, different structures are utilized. In this embodiment, semi-manufactured products are assembled in the assembling cell 1, the semi-manufactured products are transferred to the assembling cell 2, and other parts are incorporated additionally to the semi-manufactured products to complete the products in the assembling cell 2.

Next, the operation of the inspection cell 3 is described referring to FIG. 5 and FIG. 6. The inspection cell 3 inspects products completed in the assembling cell 2. On the parts pallet 22, eight completed products are placed, held by the hand 17 one by one, and transferred and placed on the holder 33. The completed products are inspected by the inspection 32, then taken out from the holder 33, and returned to the original position on the parts pallet 22. This operation is repeated eight times to finish the inspection of eight completed products on the parts pallet 22. During inspection of the completed products on another parts pallet 22 in the inspection cell 3, the inspected parts pallet 22 is removed by the stocker crane 9, and placed in the buffer shelf 4. Subsequently the next parts pallet 22 is supplied.

Figure 7:
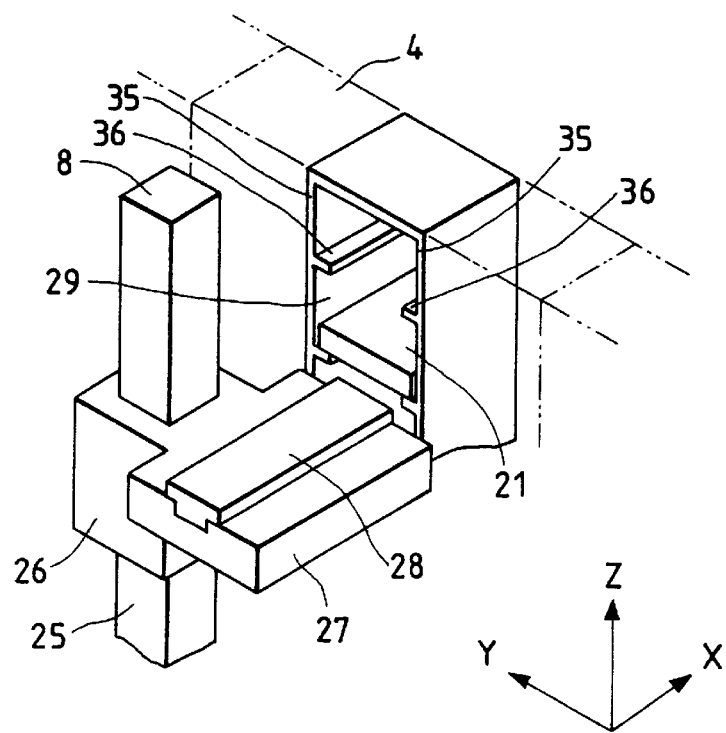
FIG. 7 is a perspective view for illustrating the outline of hand-over action of the pallet shown in FIG. 3 to FIG. 6.

Next, the pallet hand-over operation is described referring to FIG. 7 to FIG. 11. First, as shown in FIG. 7, the stocker crane 8 moves the fork 28 in the Y-direction by the running unit 24 (not shown in the figures) and in the Z-direction by the elevating unit 26 to position the fork 28 at a certain partition 29 in the buffer shelf 4. Then, the fork 28 is positioned at the standard position on the horizontally moving unit 27. The partition 29 is a space defined by the side wall 35 and a pair of canopy tops 36, and the parts pallet 21 is placed on the pair of canopy tops. The distance between canopy tops of the pair of canopy tops 36 is wider than the width of the fork 28 in the Y-direction.

Figure 8:
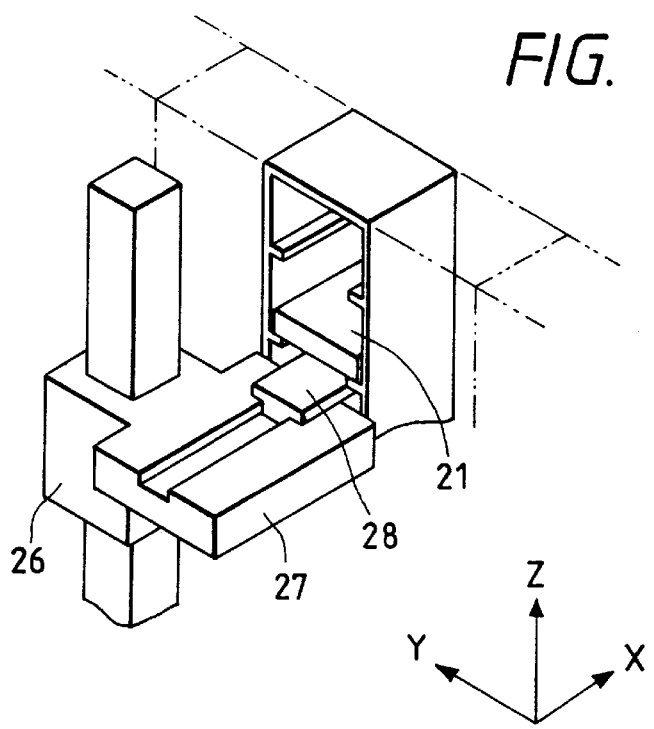
FIG. 8 is a perspective view for illustrating the outline of hand-over action of the pallet shown in FIG. 3 to FIG. 6.

Then, as shown in FIG. 8, the fork 28 is moved in the X-direction by the horizontally moving unit 27 to be positioned under the parts pallet 21.

Figure 9:
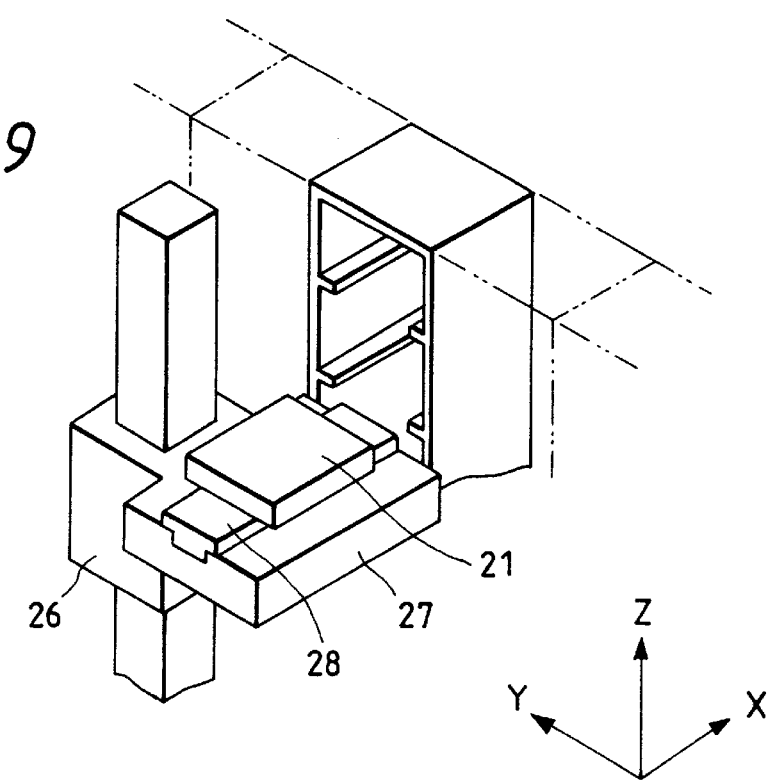
FIG. 9 is a perspective view for illustrating the outline of hand-over action of the pallet shown in FIG. 3 to FIG. 6.

As shown in FIG. 9, the fork 28 is elevated in the Z-direction by the elevating unit 26 to place the parts pallet 21 on the fork 28, and the fork 28 is moved in the X-direction to return to the standard position by the horizontally moving unit 27.

Figure 10:
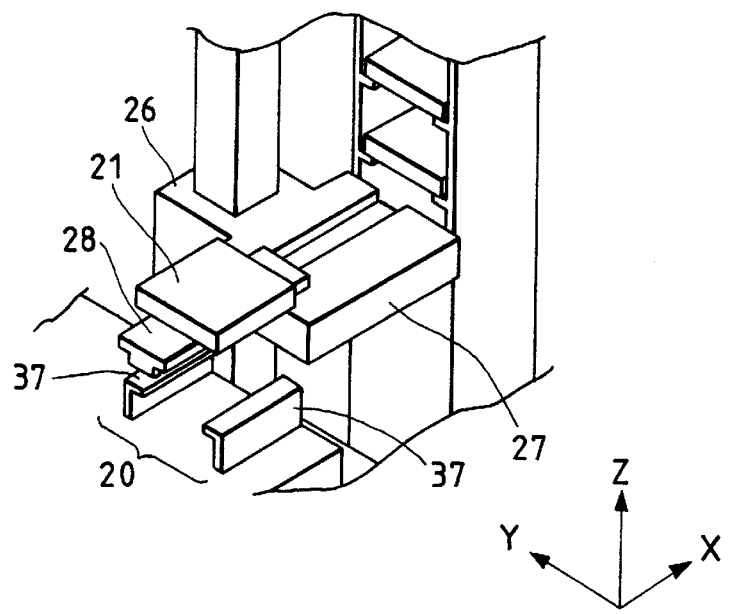
FIG. 10 is a perspective view for illustrating the outline of hand-over action of the pallet shown in FIG. 3 to FIG. 6.

Then, as shown in FIG. 10, the parts pallet 21 is moved in the Y-direction by the running unit 24 (not shown in the figures) and in the Z-direction by the elevating unit 26 to position the parts pallet above the pallet stand 20 of the assembling cell or inspection cell. Subsequently the fork 28 is moved in the X-direction by the horizontally moving unit 27 to position the parts pallet 21 just above the pallet stand 20. The pallet stand 20 is defined by two partitions 37, the distance between two partitions 37, and the distance between two partitions 37 in the Y-direction is wider than the width of the fork 28.

Figure 11:
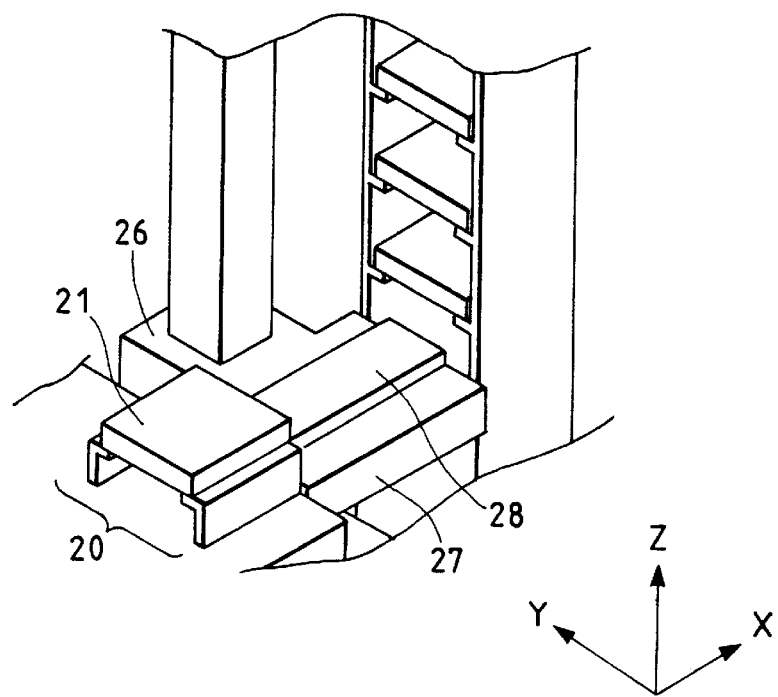
FIG. 11 is a perspective view for illustrating the outline of hand-over action of the pallet shown in FIG. 3 to FIG. 6.

As shown in FIG. 11, the fork 28 is descended in the Z-direction by the elevating unit 26 to place the parts pallet 21 on the pallet stand 20, and the fork 28 is moved in the X-direction by the horizontally moving unit 27 to return to the standard position.

The operation described above is an operation flow to supply and transfer the parts pallet 21 from the buffer shelf 4 to the pallet stand 20. For other pallets (for example, the parts pallet 22 and the hand pallet 23), the supply and transfer operation is performed in the same manner as described above. For recovery, transfer, and placing of a pallet from the pallet stand 20 to the buffer shelf 4 (for example, an empty pallet or a parts pallet loaded with completed products), the hand-over operation is performed by reversing the operation flow described above.

The partition 29 is also open to the side of the stocker crane 8, or to the side of the stocker crane 12 (FIGS. 1a, 1b). Then a pallet on the partition 29 is also taken out or replaced by the stocker crane 12. The pallet hand-over between the buffer shelf 4 and the warehouse shelf 10 is operated by the stocker crane 12, and the operation flow is the same as described for the hand-over operation flow between the buffer shelf 4 and the pallet stand 20 by the stocker crane 8. The pallet hand-over operation between the warehouse shelf 10 and the delivering-receiving station 11 is operated by the stocker crane 12, and the operation flow is the same.

Next, the movement of a pallet in assembling and inspection operations is described below referring to FIGS. 1a and 1b.

All partitions 29 of the buffer shelf 4 and all partitions of the warehouse shelf 10 are controlled by the control system (not shown in the figures). Information as to whether the partition is empty or contains a pallet (and when containing a pallet, the type of parts, whether semi-manufactured products or completed products, the type of hand pallet, and whether an empty pallet or a loaded pallet) is renewed every time a pallet is transferred, for all partitions 29 and 30 which have addresses individually represented by a position in the Y-direction and Z-direction.

First, the empty parts pallet 21 and 22 after incorporation in the assembling cell 1 is recovered by the stocker crane 8, and placed on an empty partition 29 in the common buffer 5 of the buffer shelf 4. When a plurality of partitions are empty, one partition is selected according to a certain rule. Examples of the rule include the selection of the newest address, and the selection of a partition having the smallest moving distance of the stocker crane 8. On the address of the partition which accepts the empty pallet, information of the empty pallet is registered.

When the assembling cell 1 requests the next type of part, one address of partitions 29 is selected from partitions which contain the requested part according to a certain selection rule, and from the selected partition the pallet is taken out by the stocker crane 8 and supplied. The address of the partition 29 from which the pallet was taken out is renewed and registered as an empty partition.

After incorporation in the assembling cell 1 to make a unit number (eight) of semi-manufactured products, the semi-manufactured products are placed on a parts pallet 22 for eight, and a request of removal from the assembling cell 1 is generated. The pallet loaded with the semi-manufactured products is recovered by the stocker crane 8 in the same manner as described for an empty pallet, then placed in an empty partition 29 which is selected from empty partitions 29 in the common buffer 5 according to a certain selection rule, and this address is registered as a semi-manufactured product pallet.

When the assembling cell 2 requests semi-manufactured products, an address is selected from the addresses on which a semi-manufactured product is registered, according to a certain selection rule, and the pallet is taken out from the partition 29 of the selected address and then supplied. In such case, the pallet supply is operated by the stocker crane 8 for partitions 29 of the common buffer 5 excluding common buffer 6, and by any one of stocker cranes 8 and 9 for partitions 29 which are common to the common buffer 5 and common buffer 6. Examples of a selection rule of stocker crane in the latter case include, for example, the selection for favoring short time access. In the present example, a stocker crane which is not in operation is used. The partition 29 from which the pallet was taken out is registered as an empty partition.

When the assembling cell 2 requests the supply of semi-manufactured products and the assembling cell 1 requests the removal or recovery of semi-manufactured products before starting to the common buffer 5 to take a pallet loaded with semi-manufactured products, the stocker crane 8 recovers a semi-manufactured product pallet from the assembling cell 1 and directly supplies it to the assembling cell 2. In this case, the registration is not renewed.

When the assembling in the assembling cell 2 is finished to make the unit number of products (completed products), the products are placed in the common buffer 6 temporarily or directly supplied to the inspection cell 3 without staying in the common buffer 6 in the same manner as described for semi-manufactured products in the assembling cell 1.

After inspection in the inspection cell 3, completed products of the unit number are recovered and contained in the common buffer 6, and the address is registered as containing inspected completed products.

Next, the movement of a pallet between the buffer shelf 4, the warehouse shelf 10, and the delivering-receiving station 11 is described.

Empty pallets and inspected completed product pallets contained in the buffer shelf 4 are recovered by the stocker crane 12 and contained in empty partitions 30 of the warehouse shelf 10, and loaded product names are registered. The delivery of an empty pallet or an inspected completed product is requested, then a pallet is taken out from the warehouse shelf 10 by the stocker crane 12, transferred and placed in the delivering-receiving station 11 and delivered. If, when a delivery is requested, there is no requested product in the warehouse shelf 10 but it is in the buffer shelf 4, the pallet is taken out from the buffer shelf 4 and transferred to the delivering-receiving station 11 without staying in the warehouse shelf 10.

When the delivery of new parts is requested, the new parts are transferred from the delivering-receiving station 11 to an empty partition 30 in the warehouse shelf 10 by the stocker crane 12, and a name of the product is registered. If, when the delivery is requested, there is no empty partition 30 in the warehouse shelf 10, the parts are transferred to the common buffer 5 used for the assembling cell 1 and to the common buffer 5 or 6 used for the assembling cell 2 by the stocker crane 12 without staying in the warehouse shelf 10.

Next, the changing operation of product type is described. Generally, when the product type is to be changed, the group hands are required to be changed. All hands used in the assembling cells 1 and 2 are returned to the hand pallet 23, and the hands are recovered and placed in empty partitions 29 of the buffer shelf 4 by the stocker crane 8 or 9.

When there is a hand pallet 23 loaded with group hands suitable for the next type of product, subsequent to the above mentioned recovery, the hand pallet is transferred and supplied from the buffer shelf 4 to the assembling cells 1 and 2 by the stocker crane 8 or 9. When there is no subject hand pallet in the buffer shelf 4, the pallet is transferred from the warehouse shelf 10 to an empty partition 29 in the buffer shelf 4 by the stocker crane 12, and supplied to the assembling cells 1 and 2 by the stocker crane 8 or 9. If there is no subject hand pallet also in the warehouse shelf 10, the pallet is transferred from the delivering-receiving station 11 to the buffer shelf 4 by the stocker crane 12, and supplied.

As described in the above mentioned first embodiment, according to the first embodiment, an automatic assembling system with reduced frequency of pallet transfer for transferring between assembling steps, excellent space efficiency, no necessity of controlling the number of parts in a pallet, reduced time increment of cycle time for pallet supplying, and flexibility for accommodating product type change is provided.

In the first embodiment, parts pallets 21 and 22 and a hand pallet 23 are placed on the pallet stands 20 respectively provided in the assembling cells 1 and 2 and the inspection cell 3, which stands are positioned in the moving range of the orthogonal robot (comprising X-shaft unit 13, Y-shaft unit 14, and Z-shaft unit 15), by the stocker cranes 8 and 9. However, this invention is by no means limited by the specifically-disclosed embodiment, but the stocker cranes 8 and 9 may place parts pallets 21 and 22 and hand pallet 23 in the area outside the moving range of the orthogonal robot, using a mechanism which transfers the parts pallets 21 and 22 and hand pallet 23 to the moving range of the orthogonal robot. The mechanism may be provided in the assembling cells 1 and 2 and the inspection cell 3.

In the first embodiment, the number of assembling cells (1, 2), the number of inspection cells (3), and the number of stocker cranes (8, 9, 12) are optional.

By providing a warehouse shelf instead of the buffer shelf 4, it is possible to use the warehouse shelf as the common buffer.

Figure 12:
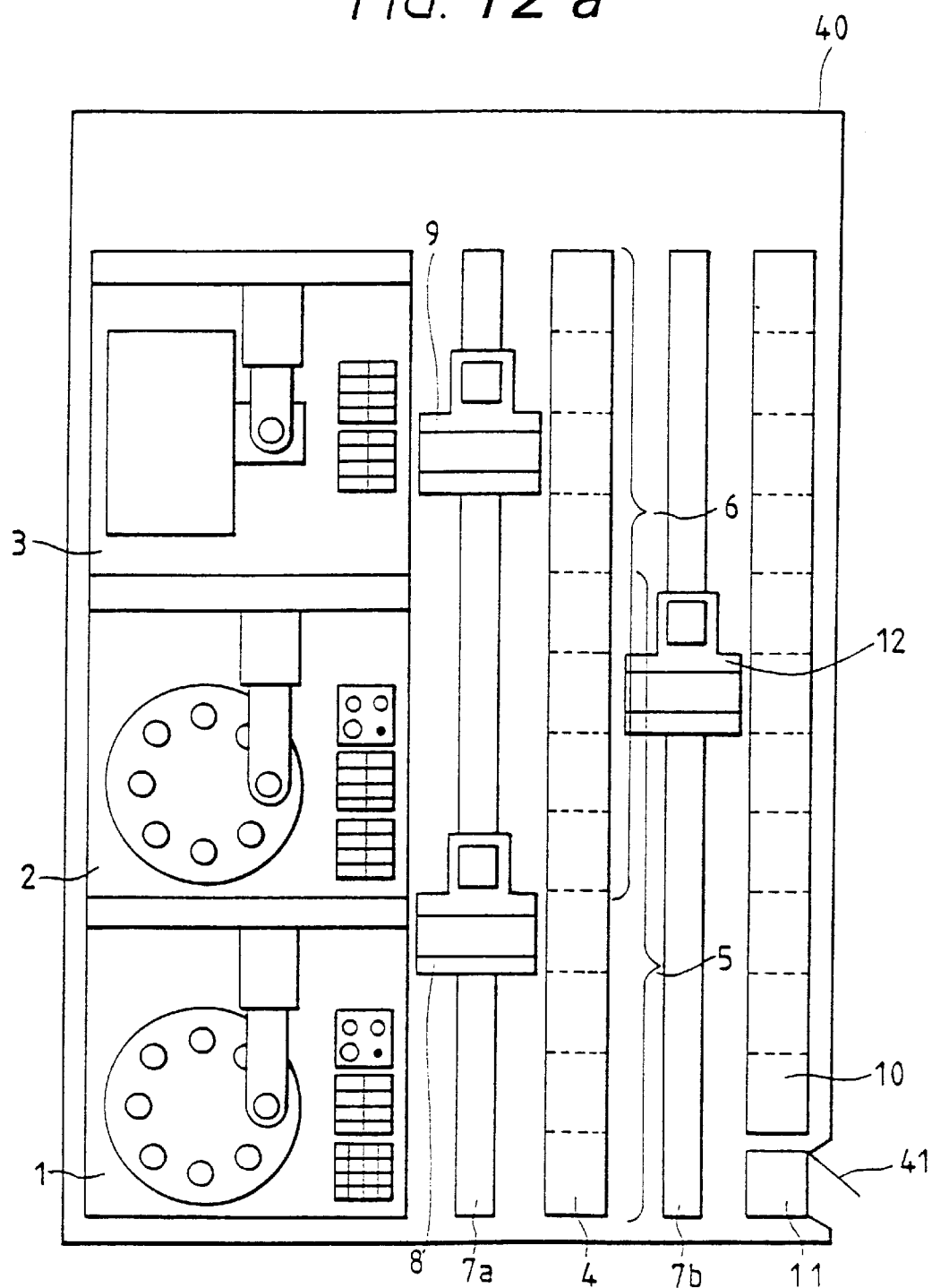
FIG. 12a is a plan view of an automatic assembling system of the second embodiment in accordance with the present invention.
FIG. 12b is another plan view of the automatic assembling system of FIG. 12a which shows a plurality of inspection cells 3.
Figure 12B:
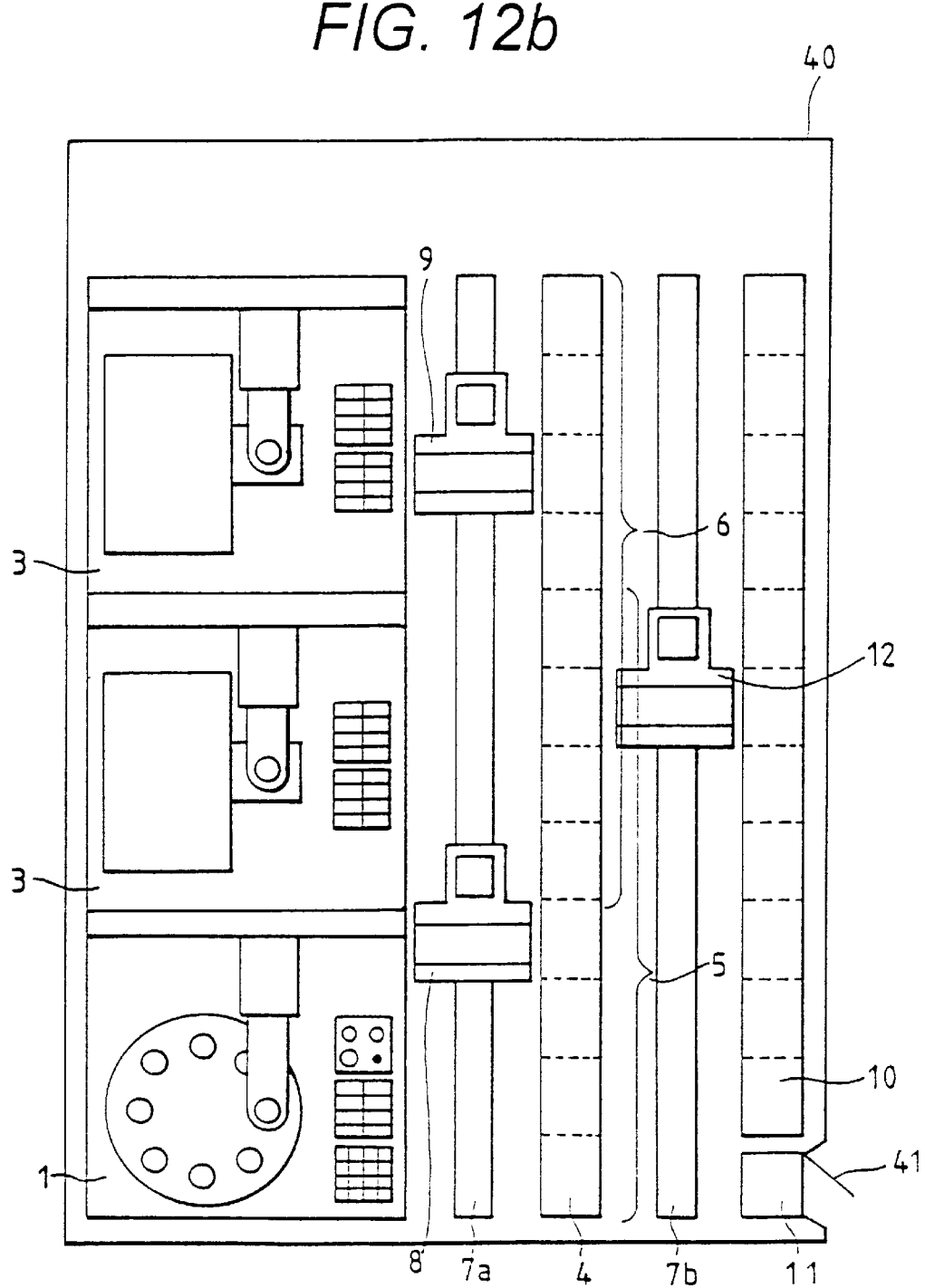
Figure 13:
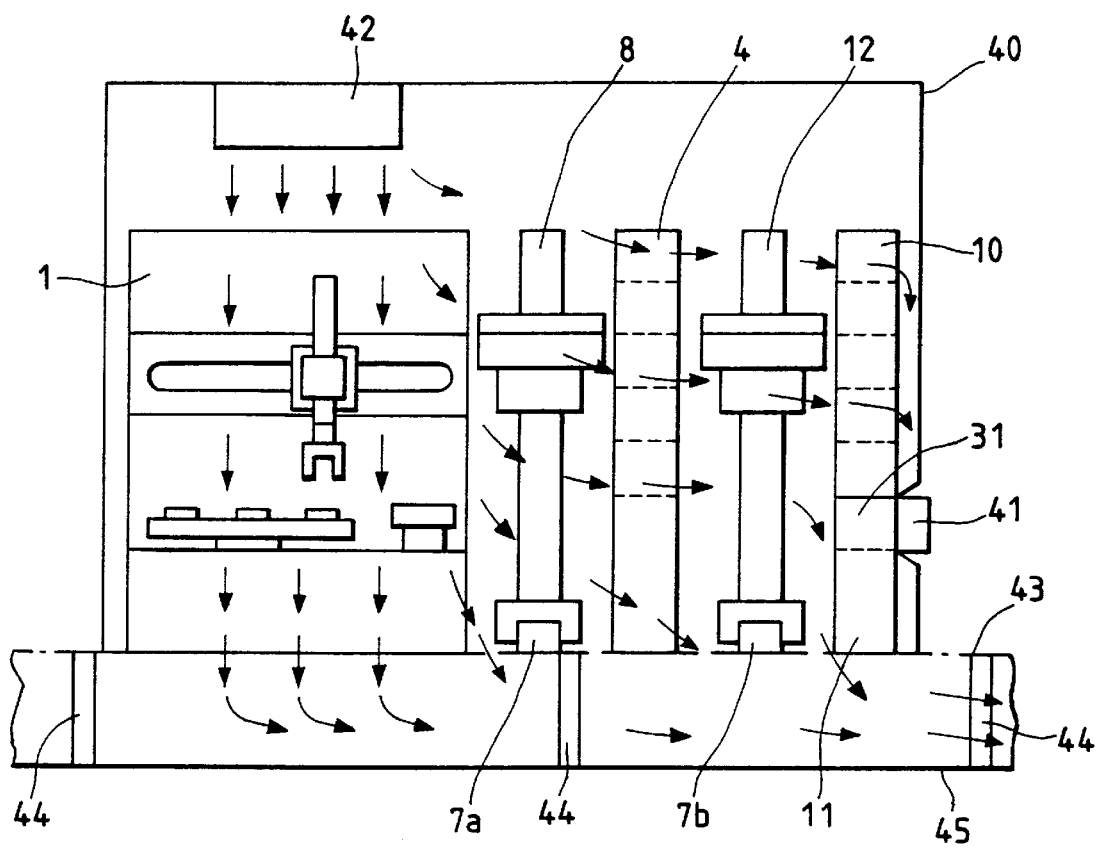
FIG. 13 is a side view of the automatic assembling system of the second embodiment in accordance with the present invention.

Next, the second embodiment in accordance with the present invention is described referring to FIGS. 12a, 12b and FIG. 13.

FIGS. 12a and 12b are plan views of an automatic assembling system of the second embodiment, and FIG. 13 is a side view of the same.

The automatic assembling system shown in FIG. 12a is a system in which the assembling system shown in FIG. 1a is enclosed by an enclosure 40 to be contained in a chamber (FIG. 12b is similar, but shows two inspection cells 3 and one assembling cell 1). On a partition 31 of the delivering-receiving station 11, a door 41 is provided which opens and closes for pallet delivery and receiving. On the ceiling of the assembling cells 1 and 2 and the inspection cell 3, an air cleaning unit 42 is installed (FIG. 13) for generation of down flow of cleaned air. The floor is made of a grating 43 for allowing air to flow, and the grating 43 is supported with columns 44 on the base 45. Air passing through the grating 43 flows down into the space between the grating 43 and the base 45, flows horizontally in the space toward the ventilation system (not shown in the figure) provided under the grating at the side, and is released outside the production system comprising the automatic assembling system.

The structure described above allows the area for assembling and inspection to be kept clean. Air blown out from the air cleaning unit 42 cannot flow to the opposite side of the room for each cell from the buffer shelf 4 due to the side wall of the enclosure 40, but flows to the buffer shelf 4 side, and reaches the warehouse shelf 10 through the buffer shelf 4 because both sides of partitions 29 of the buffer 4 are open. In this case, the cleanness decreases gradually toward the warehouse shelf 10, but with only the air cleaning unit 42 provided on the ceiling above the cell, the whole room enclosed by the enclosure 40 becomes a clean room. Thus an assembling system which requires a clean atmosphere is realized at a very low cost.

Next, the third embodiment in accordance with the present invention is described with reference to FIGS. 14a, 14b and FIG. 15.

Figure 14A:
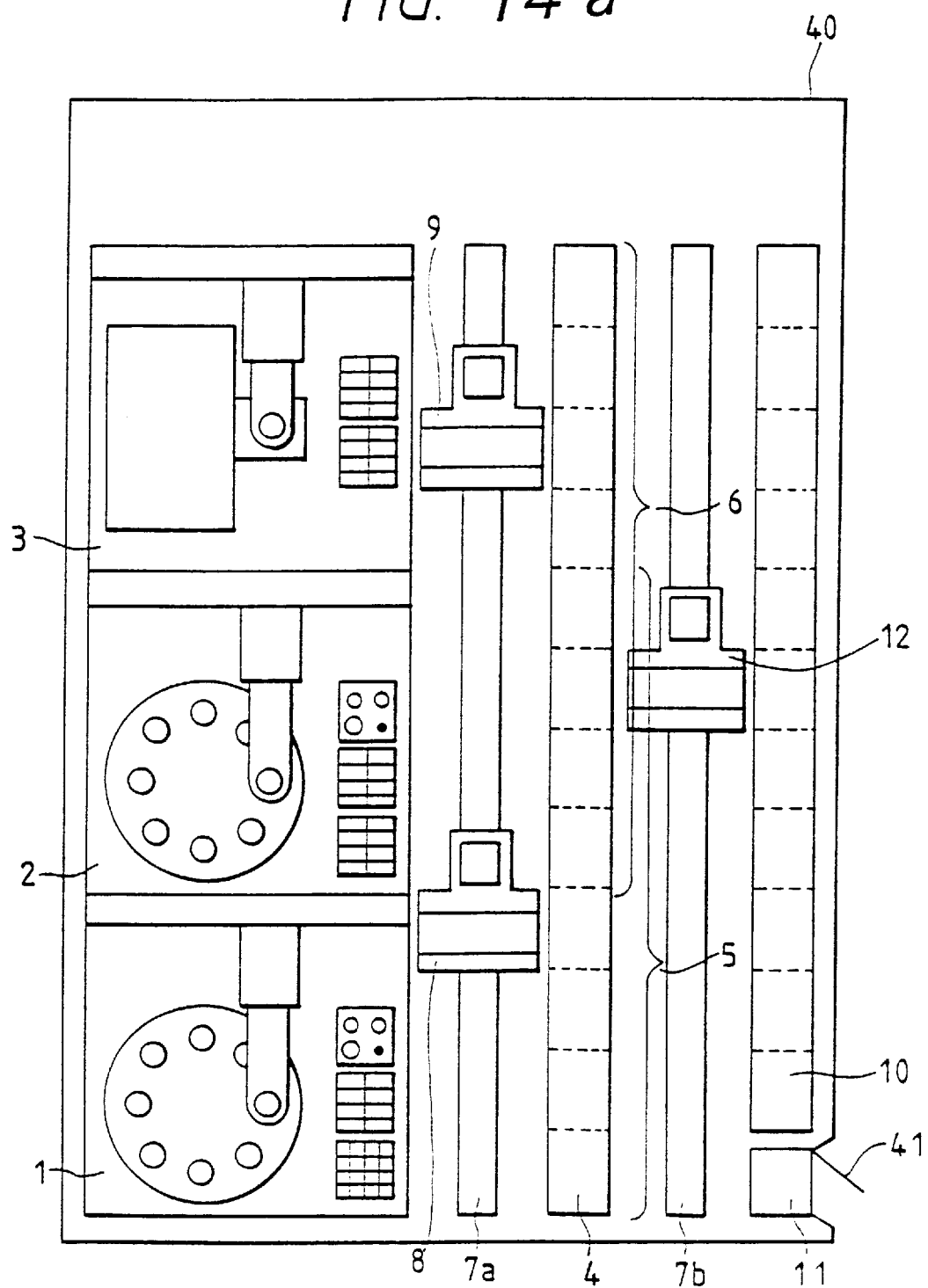
FIG. 14a is a plan view of the automatic assembling system of the third embodiment in accordance with the present invention.
Figure 14B:
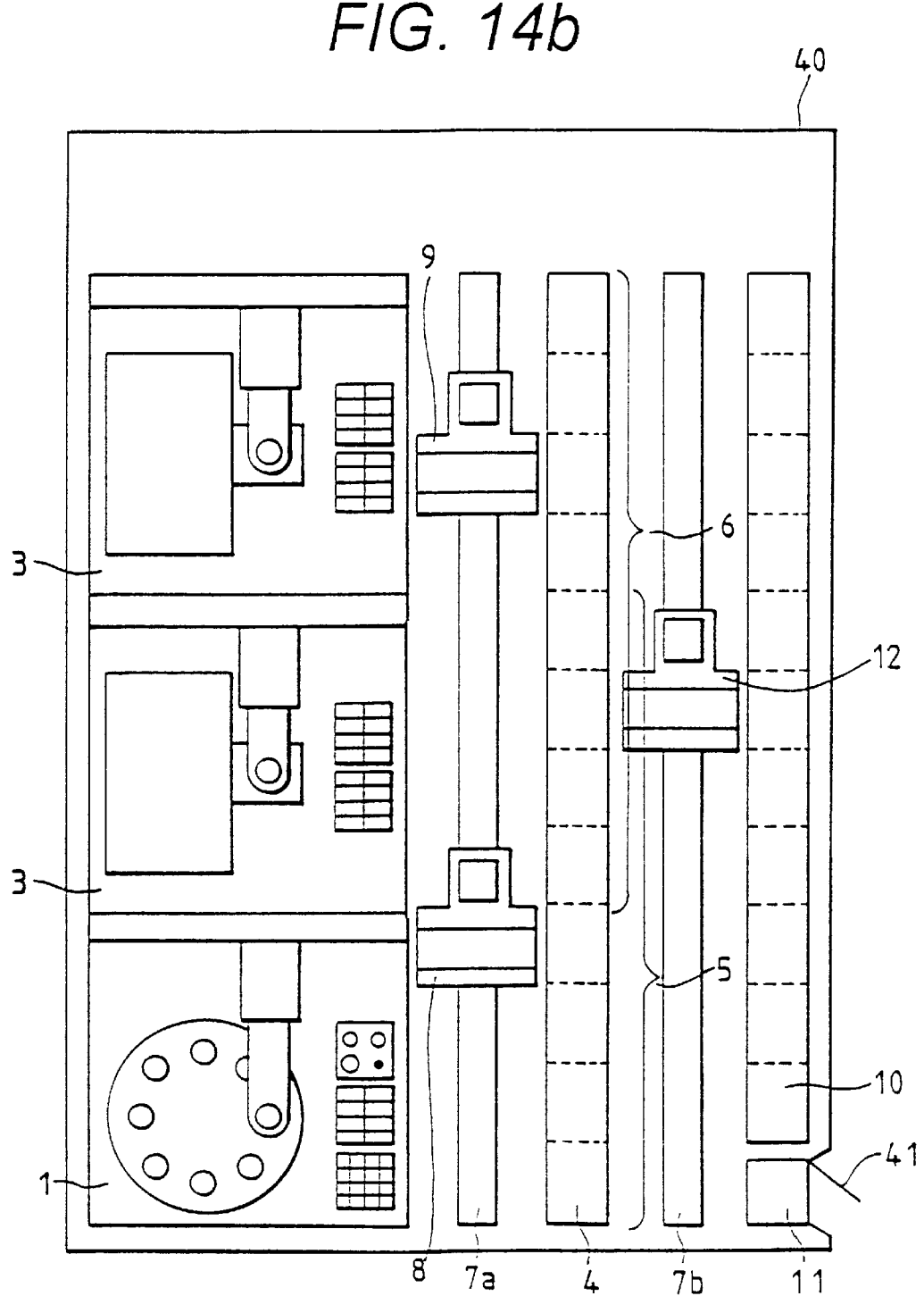
FIG. 14b is another plan view of the automatic assembling system of FIG. 14a which shows a plurality of inspection cells 3.
Figure 15:
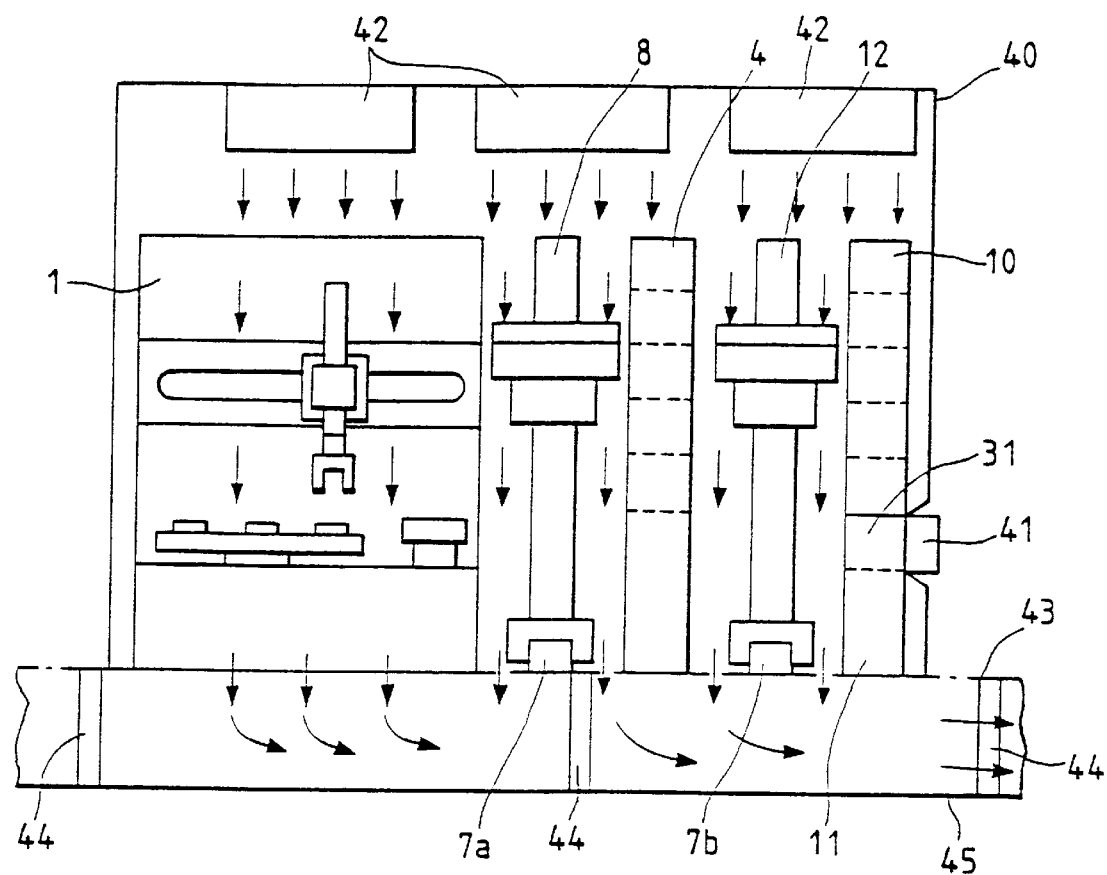
FIG. 15 is a side view of the automatic assembling system of the third embodiment in accordance with the present invention.

FIGS. 14a and 14b are plan views of an automatic assembling system of the third embodiment, and FIG. 15 is a side view of the same.

In the third embodiment, air cleaning units 42 are provided on the ceiling above the buffer shelf 4 and the warehouse shelf 10 in addition to the cells. In this case, the whole enclosed room is kept clean uniformly. Because of reduced floor area and excellent space efficiency of the automatic assembling system, the construction cost and maintenance cost of such a clean room are low.

The fourth embodiment is described with reference to FIGS. 16a, 16b and FIGS. 17a, 17b.

Figure 16:
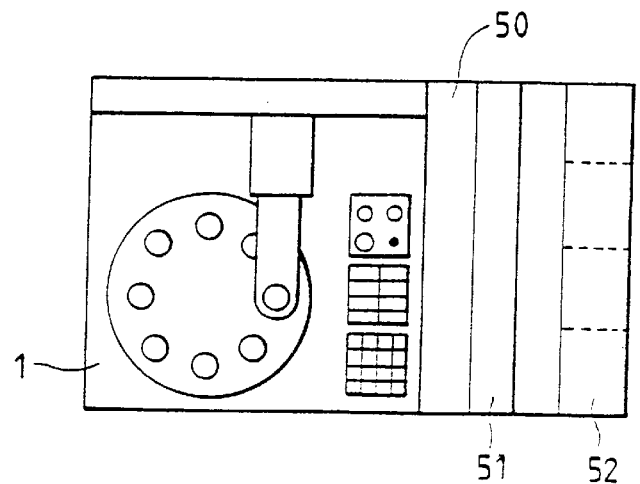
FIG. 16a is a plan view of a standard assembling cell of the fourth embodiment in accordance with the present invention.
FIG. 16b is a plan view of a standard inspection cell of the fourth embodiment in accordance with the present invention.
Figure 16B:
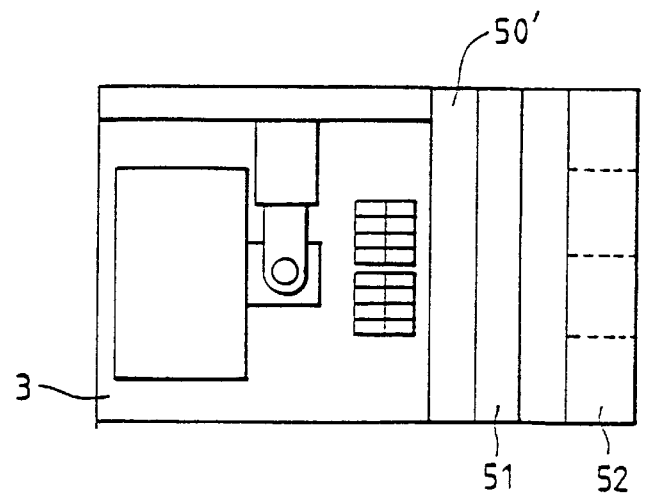
Figure 17B:
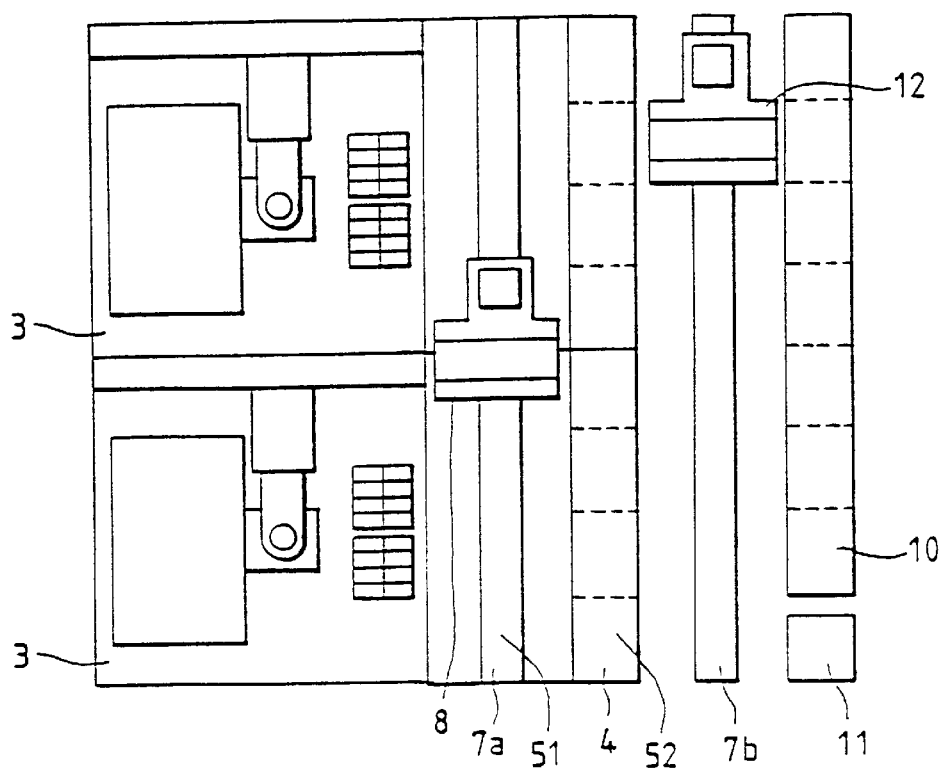
FIG. 17b is a plan view of an automatic assembling system constituted with a combination of standard inspection cells shown in FIG. 16b of the fourth embodiment in accordance with the present invention.

FIG. 16a is a plan view of a standard assembling cell 1 of the fourth embodiment, and FIG. 17a is a plan view of an automatic assembling system structured by combining the standard assembling cells 50. FIG. 16b is a plan view of a standard inspection cell 50', and FIG. 17b is a plan view of an automatic assembling system structured by comining the standard inspection cells 50'.

As shown in FIG. 16a, the standard assembling cell 50 comprises an assembling cell 1, a rail 51 with a certain length, and a shelf 52 with a certain capacity. For the inspection cell 3, FIG. 16b shows a standard inspection cell 50' (shown in FIG. 16b) formed in the same manner as described for the assembling cell. By combining two standard assembling cells 50 as shown in FIG. 17a (combining two standard inspection cells 50' is analogous; see FIG. 17b), rails 51 are combined to form a running rail 7 for a stocker crane 8 and shelves 52 are combined to form a buffer shelf 4.

In an assembling system structured as described above, the number of the standard cells are adjusted to fluctuation of required production. Thus, a flexible automatic assembling system which accommodates the fluctuation of production is provided.

Finally, the fifth embodiment is described referring to FIG. 18 to FIG. 20.

FIG. 18 is a perspective view of a rail module 53 of the fifth embodiment, FIG. 19 is a perspective view of a shelf module 54, and FIG. 20 is a plan view of an automatic assembling system using the rail modules 53 and shelf modules 54.

Rail modules 53 with a certain length shown in FIG. 18 and shelf modules 54 with a certain capacity shown in FIG. 19 are combined to constitute a running rail 7a for a stocker crane 8 and a running rail 7b for a stocker crane 12, a buffer shelf 4 and warehouse shelf 10 as shown in FIG. 20.

The structure described above allows the number of incorporated cells to be changed corresponding to the fluctuation of production, and allows the capacity of the buffer shelf 4 and warehouse shelf 10 to be adjusted corresponding to the fluctuation of work in process goods and inventory. Thus, an automatic assembling system with excellent flexibility which is accommodative to the fluctuation of production is provided.

The preferred embodiments of the present invention are summarized as follows.

An automatic assembling system includes a group cell composed of a plurality of assembling cells incorporating a plurality of types of parts, and inspection cells for inspecting products. At least one buffer containing a plurality of pallets loaded with a plurality of the same type of parts or products is provided as a common buffer serving a plurality of cells. At least one pallet hand-over mechanism for transferring pallets between the buffer and each cell is provided to the common buffer.

A warehouse unit containing a plurality of pallets may be provided, and the pallet hand-over mechanism can transfer pallets between the common buffer and the warehouse unit. The buffer is structured so that delivery and receipt of pallets a re possible for the front and rear sides of the buffer.

The buffer has a plurality of partitions, in each of a which a pallet can be placed. Partitions may be arrayed vertically to form shelves.

The pallet hand-over mechanism is movable in a plane parallel to the front side of the buffer shelf, and structured to serve for delivery and receipt of pallets between each cell provided in the front side of a buffer shelf, and the buffer shelf. The warehouse unit also has a plurality of partitions for storing pallets. The partitions form a warehouse shelf provided on the back side of the buffer shelf and parallel to the buffer shelf.

A second pallet hand-over mechanism may be provided between the buffer shelf and the warehouse shelf, movable in a plane parallel to the back side of the buffer shelf and front side of the warehouse shelf, for transferring pallets between the buffer shelf and the warehouse shelf.

Preferably, the group cell, buffer shelf, warehouse shelf, and hand-over mechanism or mechanisms are enclosed, and an air cleaning unit is provided for blowing air through the group cell toward the buffer shelf side, whereby the air cannot flow away from the buffer shelf.

Each cell may be provided with a buffer shelf having a certain capacity and a running rail of a certain length for running the pallet hand-over mechanism parallel to the buffer shelf. The running rail may be combined between adjacent cells, and buffer shelves of adjacent cells may be combined to form the group cell. The pallet hand-over mechanism moves horizontally on the running rail and vertically along the front side of the buffer shelf.

The pallets may be loaded with parts required for production of N products, or with parts in a number equivalent to (number of parts required for production of N products)× (I/M) (M is an integer), wherein the assembling cells has N assembling heads.

Each assembling cell may be provided with a plurality of pallet stands located in the moving area of the pallet hand-over mechanism, and in the moving area of an assembling robot. Preferably, the robot has a hand and a tool for assembling a plurality of types of parts, wherein the hand and tool are interchangeable, depending upon the type of parts. A separate hand pallet is provided to store a plurality of hands and tools for use by the robot.

According to these preferred embodiments, the automatic assembling system is excellent in pallet hand-over frequency for transferring between production steps, and has high operational reliability and reduced product damage. Once a pallet is unloaded, it is returned to the buffer shelf, which eliminates the need to control the number of residual parts on a pallet returned unemptied, simplifying the control system and reducing the cycle time for pallet supply. The automatic assembling systems occupies a reduced area, resulting in improved space efficiency. The automatic assembling system can thus be operated in a clean atmosphere at a low cost.

By the interchangeability of hands, mixed production of different types of products is possible. Further, by structuring the system with standard cells or modules, flexibility and fluctuation of production can be accommodated by the system.

Having described preferred embodiments of the invention with reference to the accompanying drawings, it is to be understood that the invention is not limited to the embodiments and that various changes and modifications could be effected therein by one skilled in the art without departing from the spirit or scope of the invention as defined in the appended claims.

What is claimed is:

1. An automatic assembling system, comprising:
   an assembling cell;
   an assembling robot in the assembling cell;
   a buffer for storing pallets containing parts for assembly by the assembling robot;
   a first pallet transfer mechanism for transferring pallets between the buffer and the assembling cell;
   a plurality of pallet stands for supporting pallets, including a first pallet stand in the assembling cell, a second pallet stand within a range of motion of the first pallet transfer mechanism, and a third pallet stand within a range of motion of the assembling robot;
   an inspection cell;
   a first running rail extending along said assembling cell, said inspection cell, and said buffer, said buffer being on a side of said first running rail opposite that of said assembling cell and said inspection cell;
   a first stocker crane mounted to said first running rail for travel therealong;
   a warehouse unit;
   a second running rail extending along said buffer and said warehouse unit, said buffer and said warehouse unit being on opposite sides of said second running rail;
   a second stocker crane mounted to said second running rail for travel therealong; and
   a second pallet transfer mechanism moveably mounted to said second stocker crane for transferring pallets between said warehouse unit and said buffer.

2. An automatic assembling system as claimed in claim 1, further comprising a delivering-receiving station, wherein said second running rail extends along said delivering-receiving station, and wherein said second pallet transfer mechanism transfers pallets between said delivering-receiving station and any selectable one of said buffer and said warehouse unit.

3. An automatic assembling system as claimed in claim 1, further comprising control means for addressably controlling said first stocker crane and said first pallet transfer mechanism to transfer pallets between said buffer and any selectable one of said assembling cell and said inspection cell, for addressably controlling said second stocker crane and said second pallet transfer mechanism to transfer pallets between said buffer and said warehouse unit, and for addressably controlling said second stocker crane and said second pallet transfer mechanism to transfer pallets between said delivering-receiving station and said any selectable one of said buffer and said warehouse unit.

4. An automatic assembling system as claimed in claim 3, wherein each pallet transfer robot includes a hand to which a tool is detachably attached, wherein said buffer stores at least one pallet containing a plurality of tools, and wherein said control means further controls said first pallet transfer mechanism to selectively transfer said pallet containing said tools to and from said assembling cell, for a tool exchange for said pallet transfer robot.

5. An automatic assembling system as claimed in claim 1, wherein said first pallet transfer mechanism transfers pallets between said assembling cell and said inspection cell.

6. An automatic assembling system as claimed in claim 1, wherein said buffer is accessible from a first side thereof by said first pallet transfer mechanism and from a second side thereof by said second pallet transfer mechanism.

7. An automatic assembling system as claimed in claim 1, further comprising control means for addressably controlling said first stocker crane and said first pallet transfer mechanism to transfer pallets between said buffer and any selectable one of said assembling cell and said inspection cell, wherein said control means controls said pallet transfer to said buffer so that said pallets always contain no product parts when transferred from said selectable one cell to said buffer.

8. An automatic assembling system as claimed in claim 7, including at least two of said first stocker cranes and two of said first pallet transfer mechanisms moveably mounted to a respective one of said at least two first pallet transfer mechanisms, wherein said control means controls said at least two first stocker cranes and said at least two first pallet transfer mechanisms such that one first pallet transfer mechanism transfers a pallet containing no product parts to said buffer while another first pallet transfer mechanism transfers a pallet containing product parts to said assembling cell.

9. An automatic assembling system as claimed in claim 1, wherein said buffer exists between said first and second running rails.

10. An automatic assembling system as claimed in claim 1, wherein said second pallet transfer mechanism is arranged to take pallets out from one of said warehouse unit and said buffer while said second stocker crane is on said second running rail, and to transfer said taken-out pallet into the other of said warehouse unit and said buffer while said second stocker crane is on said second running rail.

11. An automatic assembling system, comprising:
    an assembling cell;
    a first rail extending along said assembling cell;
    a buffer for storing pallets transferred with respect to said assembling cell, said pallets containing parts for automatic assembly into a product in said assembling cell, said buffer being on a side of said first rail opposite that of said assembling cell;

a first stocker crane mounted to said first rail for travel therealong;

a first pallet transfer mechanism moveably mounted to said first stocker crane;

a warehouse unit;

a second rail extending along said buffer and said warehouse unit, said buffer and said warehouse unit being on opposite sides of said second rail;

a second stocker crane mounted to said second rail for travel therealong; and a second pallet transfer mechanism moveably mounted to said second stocker crane.

12. An automatic assembling system as claimed in claim 11, wherein said buffer exists between said first and second running rails.

13. An automatic assembling system as claimed in claim 11, further comprising:

an inspection cell; and a first running rail, including said first rail, extending along said assembling cell, said inspection cell, and said buffer, said buffer being on a side of said first running rail opposite that of said assembling cell and said inspection cell.

14. An automatic assembling system as claimed in claim 13, further comprising control means for addressably controlling said first stocker crane and said first pallet transfer mechanism to transfer pallets between said buffer and any selectable one of said assembling cell and said inspection cell, and for addressably controlling said second stocker crane and said second pallet transfer mechanism to transfer pallets between said buffer and said warehouse unit.

15. An automatic assembling system as claimed in claim 13, wherein said first pallet transfer mechanism transfers pallets between said assembling cell and said inspection cell.

16. An automatic inspecting system, comprising:

an inspection cell;

a first rail extending along said inspection cell;

a buffer for storing pallets transferred with respect to said inspection cell, said pallets containing parts for inspection in said inspection cell, said buffer being on a side of said first rail opposite that of said inspection cell;

a first stocker crane mounted to said first rail for travel therealong;

a first pallet transfer mechanism moveably mounted to said first stocker crane;

a warehouse unit;

a second rail extending along said buffer and said warehouse unit, said buffer and said warehouse unit being on opposite sides of said second rail;

a second stocker crane mounted to said second rail for travel therealong; and a second pallet transfer mechanism moveably mounted to said second stocker crane.

17. An automatic inspecting system as claimed in claim 16, further comprising control means for addressably controlling said first stocker crane and said first pallet transfer mechanism to transfer pallets between said buffer and said inspection cell, and for addressably controlling said second stocker crane and said second pallet transfer mechanism to transfer pallets between said buffer and said warehouse unit.

18. An automatic assembling system as claimed in claim 16, wherein said buffer exists between said first and second running rails.

19. An automatic assembling/inspecting system, comprising:

a cell;

a first rail extending along said cell;

a buffer for storing pallets transferred with respect to said cell, said buffer being on a side of said first rail opposite that of said cell;

a first stocker crane mounted to said first rail for travel therealong;

a first pallet transfer mechanism moveably mounted to said first stocker crane;

a warehouse unit;

a second rail extending along said buffer and said warehouse unit, said buffer and said warehouse unit being on opposite sides of said second rail;

a second stocker crane mounted to said second rail for travel therealong; and a second pallet transfer mechanism moveably mounted to said second stocker crane.

20. An automatic assembling/inspecting system as claimed in claim 19, further comprising control means for addressably controlling said first stocker crane and said first pallet transfer mechanism to transfer pallets between said buffer and said cell, and for addressably controlling said second stocker crane and said second pallet transfer mechanism to transfer pallets between said buffer and said warehouse unit.

21. An automatic assembling system as claimed in claim 19, wherein said buffer exists between said first and second running rails.

22. An automatic inspecting system, comprising:

a first inspection cell;

a robot in the first inspection cell;

a buffer for storing pallets containing parts for inspection by the robot;

a first pallet transfer mechanism for transferring pallets between the buffer and the first inspection cell;

a plurality of pallet stands for supporting pallets, including a first pallet stand in the first inspection cell, a second pallet stand within a range of motion of the first pallet transfer mechanism, and a third pallet stand within a range of motion of the inspection robot;

a second inspection cell;

a first running rail extending along said first inspection cell, said second inspection cell, and said buffer, said buffer being on a side of said first running rail opposite that of said first inspection cell and said second inspection cell;

a first stocker crane mounted to said first running rail for travel therealong;

a warehouse unit;

a second running rail extending along said buffer and said warehouse unit, said buffer and said warehouse unit being on opposite sides of said second running rail;

a second stocker crane mounted to said second running rail for travel therealong; and a second pallet transfer mechanism moveably mounted to said second stocker crane for transferring pallets between said warehouse unit and said buffer.

23. An automatic assembling system as claimed in claim 22, wherein said second pallet transfer mechanism is arranged to take pallets out from one of said warehouse unit and said buffer while said second stocker crane is on said second running rail, and to transfer said taken-out pallet into the other of said warehouse unit and said buffer while said second stocker crane is on said second running rail.

24. An automatic assembling system as claimed in claim 22, wherein said buffer exists between said first and second running rails.

25. An automatic assembling system, comprising:

a first assembling cell;

an assembling robot in the first assembling cell;

a buffer for storing pallets containing parts for assembly by the assembling robot;

a first pallet transfer mechanism for transferring pallets between the buffer and the first assembling cell;

a plurality of pallet stands for supporting pallets, including a first pallet stand in the first assembling cell, a second pallet stand within a range of motion of the first pallet transfer mechanism, and a third pallet stand within a range of motion of the assembling robot;

a second assembling cell;

a first running rail extending along said first assembling cell, said second assembling cell, and said buffer, said buffer being on a side of said first running rail opposite that of said first assembling cell and said second assembling cell;

a first stocker crane mounted to said first running rail for travel therealong;

a warehouse unit;

a second running rail extending along said buffer and said warehouse unit, said buffer and said warehouse unit being on opposite sides of said second running rail;

a second stocker crane mounted to said second running rail for travel therealong; and a second pallet transfer mechanism moveably mounted to said second stocker crane for transferring pallets between said warehouse unit and said buffer.

26. An automatic assembling system as claimed in claim 25, wherein said second pallet transfer mechanism is arranged to take pallets out from one of said warehouse unit and said buffer while said second stocker crane is on said second running rail, and to transfer said taken-out pallet into the other of said warehouse unit and said buffer while said second stocker crane is on said second running rail.

27. An automatic assembling system as claimed in claim 25, wherein said buffer exists between said first and second running rails.

* * * * *